United States Patent
Takayama et al.

(10) Patent No.: US 8,112,448 B2
(45) Date of Patent: Feb. 7, 2012

(54) TABLE CLASSIFICATION DEVICE, TABLE CLASSIFICATION METHOD, AND TABLE CLASSIFICATION PROGRAM

(75) Inventors: Shigenobu Takayama, Tokyo (JP); Ayako Kirimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 568 days.

(21) Appl. No.: 12/360,432

(22) Filed: Jan. 27, 2009

(65) Prior Publication Data

US 2010/0030801 A1    Feb. 4, 2010

(30) Foreign Application Priority Data

Aug. 1, 2008    (JP) .................................. 2008-199127

(51) Int. Cl.
    *G06F 17/30*    (2006.01)
(52) U.S. Cl. .................. 707/797; 707/956; 707/964
(58) Field of Classification Search .................. 707/609, 707/705, 778, 791, 794, 797, 798, 802, 829, 707/956, 964, E17.046, E17.089, E17.095
See application file for complete search history.

(56) References Cited

U.S. PATENT DOCUMENTS

| | | | | |
|---|---|---|---|---|
| 7,016,903 | B1 * | 3/2006 | Thusoo et al. ........................ | 1/1 |
| 2003/0233350 | A1 * | 12/2003 | Dedhia et al. ..................... | 707/3 |
| 2006/0031217 | A1 * | 2/2006 | Smith et al. ....................... | 707/5 |

FOREIGN PATENT DOCUMENTS

| | | |
|---|---|---|
| EP | 1168201 A2 * | 1/2002 |
| JP | 11-213014 | 8/1999 |
| JP | 11-250092 | 9/1999 |
| JP | 2006-228150 | 8/2006 |

OTHER PUBLICATIONS

Bergamaschi et al, A Data Integration Framework for E-commerce Product Classification, 2002, pp. 1-15.*
Fan et al, Concept-Oriented Indexing of Video Databases: Toward Semantic Sensitive Retrieval and Browsing, 2004 IEEE, pp. 974-992.*
Kashyap et al, Semantic and schematic similarities between database objects: a context-based approach, VLDB Journal (1996) 5: pp. 276-304.*
Rahm et al, A survey of approaches to automatic schema matching, VLDB Journal (2001) 10: pp. 334-350.*
Erhard Rahm et al, A Survey of Approaches to Automatic Schema Matching, The VLDB Journal/ Digital Object Identifier (DOI), 2001, pp. 334-350.

* cited by examiner

*Primary Examiner* — Fred I Ehichioya
(74) *Attorney, Agent, or Firm* — Oblon, Spivak, McClelland, Maier & Neustadt, L.L.P.

(57) ABSTRACT

The present invention aims to facilitate integration of databases by classifying a plurality of tables in databases into a group of similar tables. A table classification device 1 includes a semantic classifying unit 20 carrying out classification with considering meanings of columns which form a database and a statistical classifying unit 30 carrying out classification based on statistical information of the columns. The tables are classified hierarchically by combining a classification method of the semantic classifying unit 20 and a classification method of the statistical classifying unit 30.

13 Claims, 32 Drawing Sheets

112: COLUMN NODE

| NODE ID NO. | NODE NAME | NODE TYPE | COLUMN TYPE | SIZE | SCALE | KEY INFORMATION | AVAILABILITY OF NULL |
|---|---|---|---|---|---|---|---|
| 113 | 114 | 115 | 116 | 117 | 118 | 119 | 120 |

111: TABLE NODE

| NODE ID NO. | NODE NAME | NODE TYPE |
|---|---|---|
| 113 | 114 | 115 |

Fig. 4

COLUMN CORRESPONDENCE TABLE 141

| DB TYPE | UNIQUE COLUMN TYPE 142 | COMMON COLUMN TYPE 143 |
|---|---|---|
| IBM DB2 | Char | char |
|  | Varchar | varchar |
|  | date | Date |
|  | integer | Int |
|  | ... |  |
| Microsoft SQLServer | Char | char |
|  | Varchar | varchar |
|  | Datatime | Datetime |
|  | int | Int |
|  | ... |  |
| Oracle | Char | char |
|  | Varchar | varchar |
|  | Date | Datetime |
| ... | ... |  |
| ... | ... |  |

Fig. 5

| COLUMN LIST 12 | | | | |
|---|---|---|---|---|
| COLUMN NO. 121 | COLUMN TYPE 122 | COLUMN SIZE 123 | SCALE 124 | NO. OF APPEARANCES 125 |
| 1 | Datetime | 7 | | |
| 2 | char | 12 | | |
| 3 | char | 32 | | |
| 4 | char | 64 | | |
| 5 | char | 256 | | |
| 6 | char | | | |
| 7 | int | | | |
| 8 | char | 128 | | |
| 9 | ... | | | |
| 10 | ... | | | |
| ... | | | | |
| ... | | | | |
| ... | | | | |
| ... | | | | |
| ... | | | | |
| n | | | | |

Fig. 6

FREQUENTLY APPEARING COLUMN LIST

| ORDER OF APPEARANCE | COLUMN NO. | NO. OF APPEARANCES | APPEARANCE RATE |
|---|---|---|---|
| 1 | 7 | 3257 | 27.1 % |
| 2 | 1 | 1520 | 12.7 % |
| 3 | 5 | 850 | 7.1 % |
| 4 | 6 | 603 | 5.0 % |
| 5 | 8 | 560 | 4.7 % |
| 6 | 2 | 252 | 2.1 % |
| 7 | 4 | 240 | 2.0 % |

MINIMUM APPEARANCE RATE 2.0%

Fig. 13

21: TABLE SEMANTIC CLASSIFICATION TABLE

| GROUP NO. | | 1ST COLUMN NO. | 2ND COLUMN NO. | 3RD COLUMN NO. | ... | N-TH COLUMN NO. | ID LIST OF BELONGING TABLE NODE |
|---|---|---|---|---|---|---|---|
| 1 | | 2 | | | | | 38, 79, 183, ......... |
| | 21 | 4 | 6 | | | | 15, 28, 39, ......... |
| 2 | 221 | 4 | 7 | 6 | | | 89, 56... |
| | 22 | 4 | 7 | OTHER THAN 6 | | | 122, 169... |
| | 23 | 4 | OTHER THAN 6, 7 | | | | 11, 23... |
| 3 | 31 | 7 | 1 | | | | 3, 53... |
| | 32 | 7 | 6 | | | | 81, 117... |
| | | 7 | OTHER THAN 1, 6 | | | | 121, 172 |
| ... | | ... | | | | | ... |
| | | | | | | | 162, 142... |

Fig. 30

COLUMN LIST /12

| COLUMN NO. | COLUMN TYPE /122 | COLUMN SIZE /123 | SCALE /124 | AVAILABILITY OF NULL VALUE /126 | NO. OF APPEARANCES /125 |
|---|---|---|---|---|---|
| 1 | Datetime | | | Yes | |
| 1a | | | | No | |
| 2 | char | 7 | | Yes | |
| 2a | | | | No | |
| 3 | char | 12 | | Yes | |
| 3a | | | | No | |
| 4 | char | 32 | | Yes | |
| 4a | | | | No | |
| 5 | char | 64 | | Yes | |
| 5a | | | | No | |
| 6 | Char | 256 | | Yes | |
| 6a | | | | No | |
| 7 | Int | | | Yes | |
| 7a | | | | No | |
| 8 | Char | 128 | | Yes | |
| 8a | | | | No | |
| ... | | | | | |
| n | | | | | |

COLUMN LIST /12

| COLUMN NO. /121 | COLUMN TYPE /122 | COLUMN SIZE /123 | SCALE /124 | INDICATION OF A KEY ITEM /127 | NO. OF APPEARANCES /125 |
|---|---|---|---|---|---|
| 1 | Datetime | | | Yes | |
| 1a | | | | No | |
| 2 | char | 7 | | Yes | |
| 2a | | | | No | |
| 3 | char | 12 | | Yes | |
| 3a | | | | No | |
| 4 | char | 32 | | Yes | |
| 4a | | | | No | |
| 5 | char | 64 | | Yes | |
| 5a | | | | No | |
| 6 | Char | 256 | | Yes | |
| 6a | | | | No | |
| 7 | Int | | | Yes | |
| 7a | | | | No | |
| 8 | Char | 128 | | Yes | |
| 8a | | | | No | |
| ... | | | | | |
| ... | | | | | |
| n | | | | | |

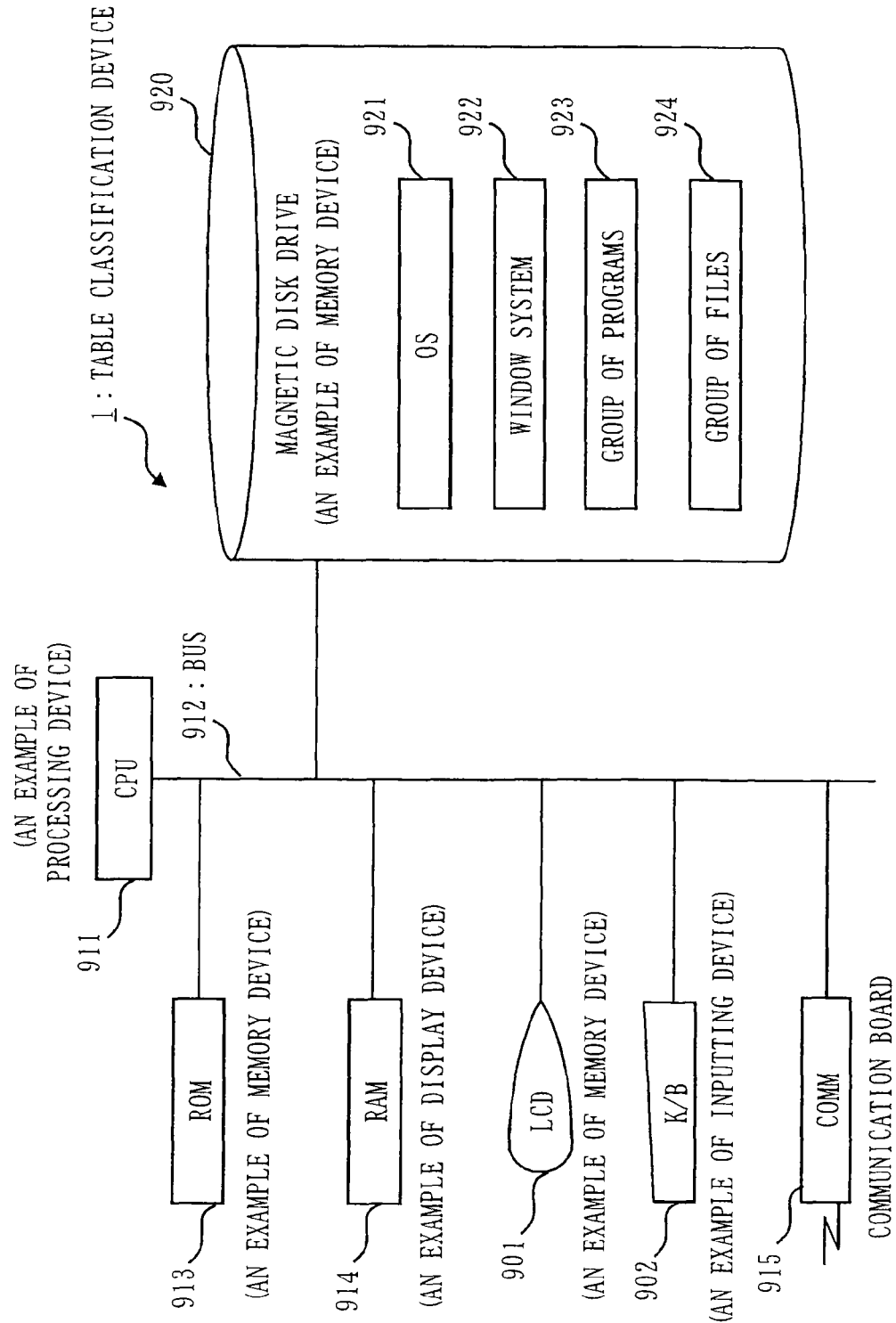

TABLE CLASSIFICATION DEVICE, TABLE CLASSIFICATION METHOD, AND TABLE CLASSIFICATION PROGRAM

BACKGROUND OF THE INVENTION

1. Field of the Invention

The present invention relates to, for example, technique to classify a plurality of tables included in a database.

2. Discussion of the Background

There exist various kinds of databases in a company, and such databases have been large-scaled or complicated. Within the company or among companies, in case of integrating various kinds of databases, in order to achieve consistency of data, it is necessary to integrate tables or columns showing the same contents. Therefore, first, from a result of checking specifications of the databases by a specialist in database or modeling, or based on opinions of specialists belonging to each organization, a list of similar tables or columns, or redundant tables or columns is generated. Then, based on the generated list, the databases are integrated.

Recently, a tool for supporting schema matching has been developed as the integration of databases. This tool is to retrieve tables or columns having similar names from the databases of the whole company and to support the integration.

The non-patent document 1 describes a method of integration from a viewpoint of schema integration. The non-patent document 1 shows an example of comparing columns with considering a type of column, or if it is a key item or not in the classification of types of columns which form tables. However, although the non-patent document 1 describes the comparison of columns, no description is done for comparison of tables based on a type of columns, etc. which form tables.

LIST OF REFERENCES

[Non-Patent Document 1] Rahm, E. and Bernstein, P. A., "A survey of approaches to automatic schema matching." VLDB J(10) pp. 334-350, 2001.

In case of integration of databases in a company or among companies, if it is large-scaled, some tens of thousands of columns are compared, and out of some hundreds or some thousands of tables, tables including the same columns or similar columns should be extracted. Then, an operation is necessary such that one of the tables including the same columns should be deleted, or tables including similar columns should be integrated.

However, even if the similarity of columns is found, it is not easy to determine if tables are similar or not based on information of similarity of columns. For example, it is assumed that a table A and a table B respectively include the same column X. Here, the column X in the table A may be a main key, and the column X in the table B is a foreign key for referencing to the table A. In such a case, even if the table A and the table B include the same column X, the meaning (role) of the column X in the table A and the meaning of the column X in the table B are different. Namely, although the table A and the table B include the same column X, they are not similar tables and cannot be a target of integration. Like this, it is impossible to determine the equality and the similarity as the table structure by only comparing the equality and the similarity of each of the columns.

The present invention aims to facilitate integration of databases by classifying a plurality of tables in databases into groups of similar tables.

SUMMARY OF THE INVENTION

A table classification device related to the present invention for classifying, for example, a plurality of tables included in a plurality of databases into a plurality of groups, the table classification device is characterized to include: using a processing device, a first classifying unit for determining if respective tables of the plurality of tables are similar or not based on column information including locations of columns in the respective tables, and according to determination result, classifying the plurality of tables into a plurality of groups; using the processing device, a second classifying unit for determining if the respective tables of the plurality of tables are similar or not based on column information other than locations of columns in the respective tables, and according to determination result, classifying the plurality of tables into a plurality of groups; and an outputting unit for outputting result classified by the first classification unit and the second classification unit to an outputting device.

According to another aspect of the invention, a table classification device for classifying a plurality of tables included in a plurality of databases, the table classification device is characterized to include: using a processing device, a role classifying unit for determining if respective tables of the plurality of tables are similar or not based on if columns of a same role are similar or not in the respective tables, and according to determination result, classifying the plurality of tables into a plurality of groups; using the processing device, a statistical classifying unit for determining if the respective tables of the plurality of tables are similar or not based on if a similar column is included or not regardless of the role of the column in the respective tables, and according to determination result, classifying the plurality of tables into a plurality of groups; and an outputting unit for outputting result classified by the role classifying unit and the statistical classifying unit to an outputting device.

According to another aspect of the invention, a table classification method classifying a plurality of tables included in a plurality of databases into a plurality of groups, the table classification method is characterized to include: using a processing device, a first classifying step for determining if respective tables of the plurality of tables are similar or not based on column information including locations of columns in the respective tables, and according to determination result, classifying the plurality of tables into a plurality of groups; using the processing device, a second classifying step for determining if the respective tables are similar or not based on column information other than locations of columns in the respective tables, and according to determination result, classifying the plurality of tables into a plurality of groups; and using an outputting device, an outputting step for outputting result classified by the first classification step and the second classification step.

According to another aspect of the invention, a table classification program classifying a plurality of tables included in a plurality of databases into a plurality of groups, the table classification program is characterized to include: a first classifying process for determining if respective tables are similar or not based on column information including locations of columns in the respective tables, and according to determination result, classifying the plurality of tables into a plurality of groups; a second classifying process for determining if the respective tables are similar or not based on column information other than locations of columns in the respective tables, and according to determination result, classifying the plurality of tables into a plurality of groups; and an outputting process for outputting result classified by the first classification step and the second classification step.

BRIEF DESCRIPTION OF THE DRAWINGS

A complete appreciation of the present invention and many of the attendant advantages thereof will be readily obtained as the same becomes better understood by reference to the following detailed description when considered in connection with the accompanying drawings, wherein:

FIG. 4 shows a column correspondence table 14;

FIG. 5 shows a column list 12;

FIG. 6 shows a frequently appearing column list 13;

FIG. 13 shows a table semantic classification table 21;

FIG. 30 shows a column list 12 with considering availability of NULL value;

FIG. 31 shows the column list 12 with considering if it is a key item or not; and FIG. 32 shows an example of hardware configuration of the table classification device 1.

DESCRIPTION OF THE PREFERRED EMBODIMENTS

Embodiment 1

In the present embodiment, a classification method by combining the following two classification methods will be explained: (1) a semantic classification method determining similarity of tables with considering meaning (role) of columns in the table and classifying the tables, and (2) a statistical classification method determining similarity of tables without considering meaning of columns in the table and classifying the tables.

Figure 1:
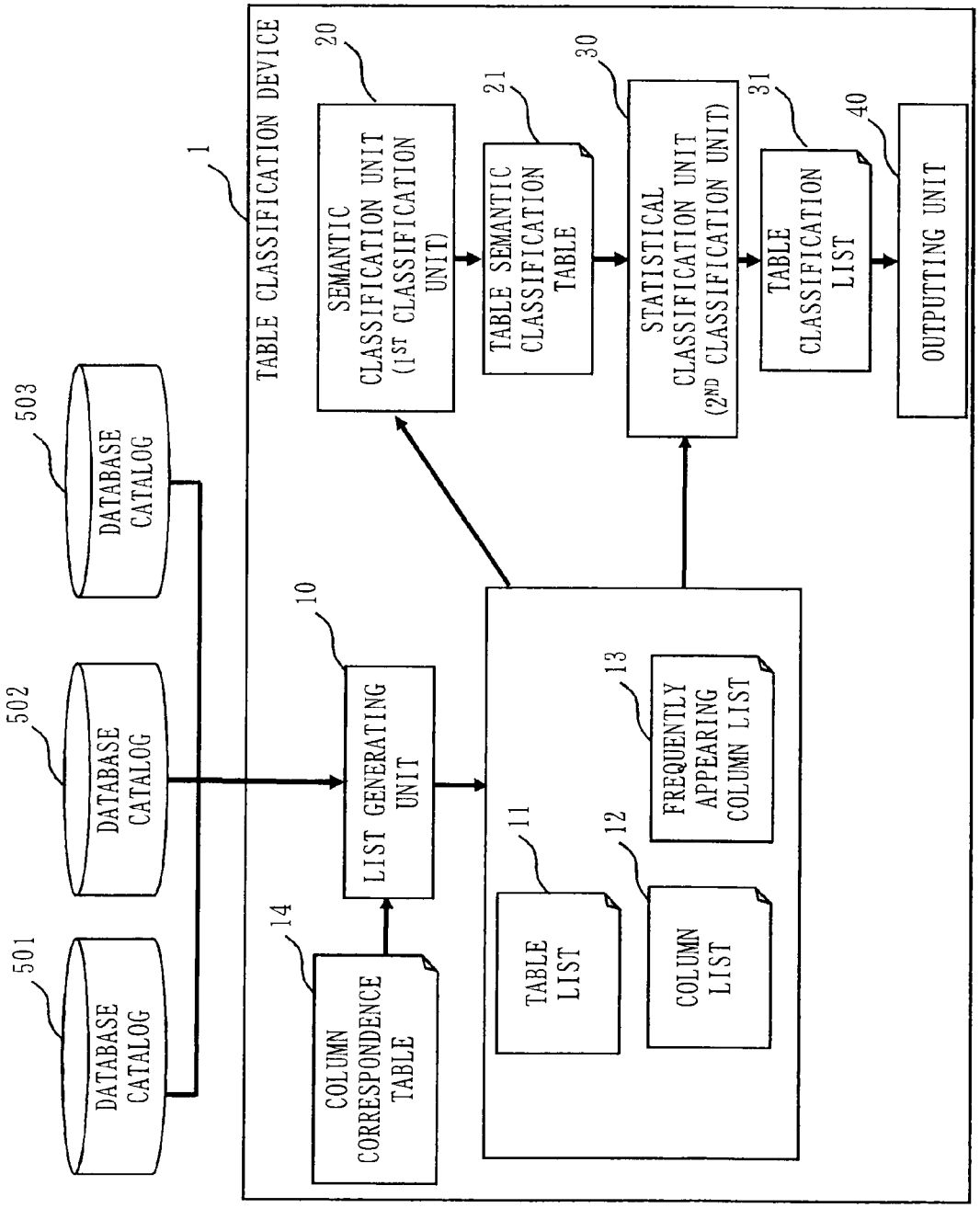
FIG. 1 is a functional block diagram showing functions of a table classification device 1.

FIG. 1 is a functional block diagram showing functions of a table classification device 1.

The table classification device 1 classifies a plurality of tables stored in various databases in a company into a plurality of groups based on similarity of a type, a size, a precision (scale) of columns included in a table.

The table classification device 1 includes a list generating unit 10, a semantic classifying unit 20 (the first classification unit), a statistical classifying unit 30 (the second classification unit), and an outputting unit 40.

The list generating unit 10 imports database catalog which will be inputted. The list generating unit 10 inputs the database catalog and a column correspondence table 14, generates a table list 11, a column list 12, and a frequently appearing column list 13 using a processing device, and outputs the table list 11, the column list 12, and the frequently appearing column list 13.

The semantic classifying unit 20 classifies tables by the semantic classification method. The semantic classifying unit 20 inputs the table list 11 and the column list 12, generates a table semantic classification table 21 in which a plurality of tables shown by the table list 11 are classified into a plurality of groups using the processing device, and outputs the table semantic classification table 21.

The semantic classifying unit 20 determines meaning of the column in the table based on a location of the column in each table. Further, the semantic classifying unit 20 determines that a column having a prescribed meaning is an important column in the table. The semantic classifying unit 20 determines if tables are similar or not based on whether the columns, which have the prescribed meaning and are determined as important, are similar or not. Then, the semantic classifying unit 20 generates the table semantic classification table 21 in which the tables are classified into a plurality of groups according to the determination result.

Here, it is assumed by the semantic classifying unit 20 that columns located near the top of each table might possibly be key items and important. Then, the semantic classifying unit 20 generates the table semantic classification table 21 in which the tables are classified into a plurality of groups based on whether the columns located near the top are similar or not.

The statistical classifying unit 30 classifies tables by the statistical classification method. The statistical classifying unit 30 inputs a table semantic classification table 21 and a frequently appearing column list 13, generates a table classification list 31, in which the tables classified into the same group by the semantic classifying unit 20 are further classified in detail, using the processing device and outputs the table classification list 31.

The statistical classifying unit 30 determines an important column statistically without considering the meaning of the column in the table. The statistical classifying unit 30 determines if tables are similar or not based on whether the column, which is determined to be important statistically, is common or not. Then, the statistical classifying unit 30 generates the table classification list 31 in which the tables are classified into a plurality of groups according to the determination result.

Here, the statistical classifying unit 30 treats the column whose appearance rate is high is an important column. Then, the statistical classifying unit 30 generates the table classification list 31 in which the tables are classified into a plurality of groups based on whether the column whose appearance rate is high is common or not.

In particular, the statistical classifying unit 30 classifies further in detail the plurality of tables classified into the same group by the semantic classifying unit 20.

The outputting unit 40 outputs a result classified by the semantic classifying unit 20 and the statistical classifying unit 30 to an outputting device. Namely, the outputting unit 40 outputs the table classification list 31.

Here, the database catalog includes table information of tables by which the database is structured. The database catalog is information generally included in a database. Here, the list generating unit 10 inputs database catalogs (database catalogs 501, 502, and 503 in the figure) of various databases of different types.

Next, the table list 11, the column list 12, the frequently appearing column list 13, and the column correspondence table 14 will be explained. Further, an operation of the list generating unit 10 will be explained in addition to the explanation of the table list 11, the column list 12, the frequently appearing column list 13, and the column correspondence table 14.

Figure 2:
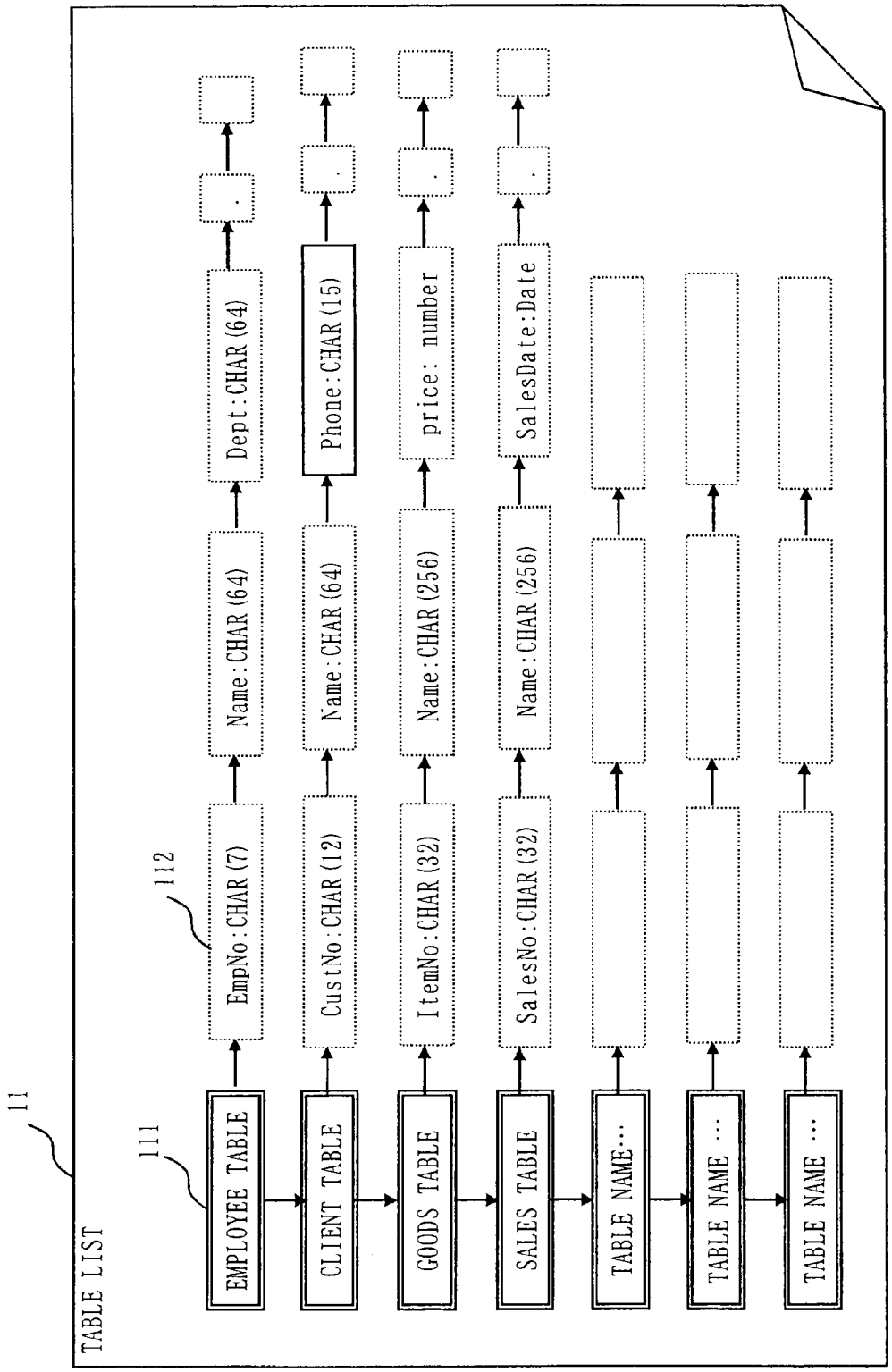
FIG. 2 shows a table list 11.

FIG. 2 shows the table list 11. The table list 11 includes information of the tables (table nodes 111) included in the database and information of columns (column nodes 112) included in the table.

Figure 3B:
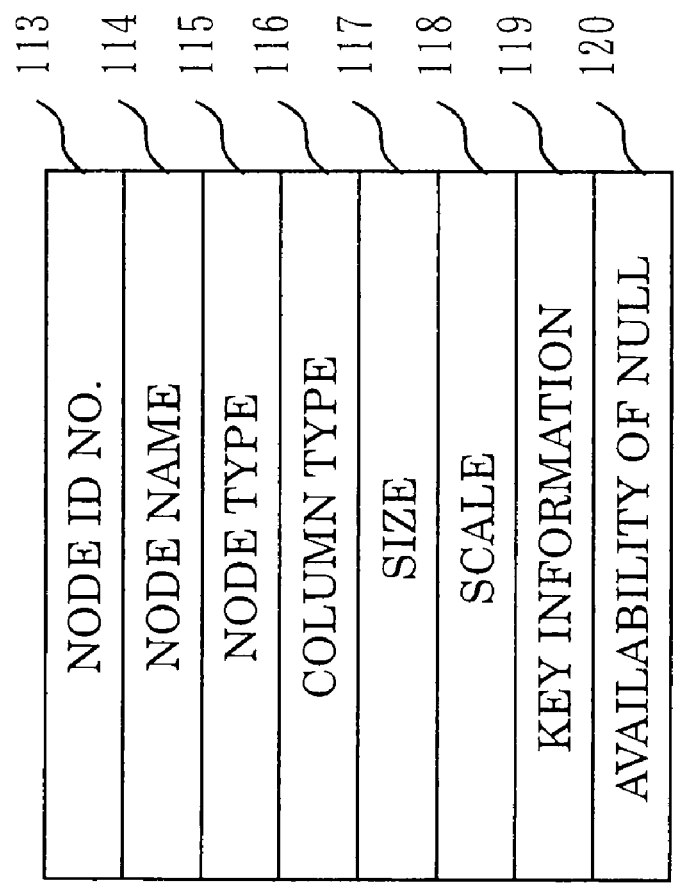
FIGS. 3A and 3B respectively show a table node 111 and a column node 112 included in the table list 11.
Figure 3A:

FIGS. 3A and 3B respectively show the table node 111 and the column node 112 included in the table list 11. FIG. 3A shows the table node 111, and FIG. 3B shows the column node 112.

First, the list generating unit 10 obtains table information sequentially from each database catalog. The list generating unit 10 can obtain the table information from the database catalog by using an application program interface which is regularly equipped to the database.

The table information includes a table name and information of columns which form the table. Further, the information of columns includes a type (for example, a character type, a number type, a date type, etc.), a size, a scale (precision) of a column, key information (a main key, a foreign key, etc.), availability of NULL, and so on.

Next, the list generating unit 10 generates the table node 111 and the column node 112, which form the table list 11, from the table information obtained.

The table node 111 includes a node identification number 113, a node name 114, and a node type 115. The node identification number 113 stores an identifier to identify a node uniquely The node name 114 stores a table name. The node type 115 stores an identifier to identify a table.

The column node 112 includes the node identification number 113, the node name 114, the node type 115, a column type 116, a size 117, a scale 118, key information 119 (whether it is a key item or not), and "availability of NULL value" 120 (whether it is a column for which the use of NULL is allowed or not). The node identification number 113 stores an identifier to identify a node uniquely. The node name 114 stores a column name. The node type 115 stores an identifier to identify a column. Further, the column type 116, the size 117, the scale 118, the key information 119, and the "availability of NULL value" 120 store setting information of the column.

Then, the list generating unit 10, for each table, connects the column node 112 belonging to the table from the table node 111 with a list according to an order of alignment of columns in the table. After generating the table node 111 and the column node 112 for all the tables, the list generating unit 10 connects each table node 111 with the list. By this operation, the table list 11 is generated.

FIG. 4 shows a column correspondence table 14.

The column correspondence table 14 is information showing correspondence relationship of columns among databases of different types.

Definition of types of columns differs according to various database management systems of different types employed by a company. Thus, the list generating unit 10 identifies correspondence of columns among the databases of different types using the column correspondence table 14.

The column correspondence table 14 includes a DB type 141 (type of database), a unique column type 142, and a common column type 143.

The DB type 141 stores each database management system name (for example, Oracle (the registered trademark), IBM DB2 (the registered trademark), Microsoft (the registered trademark) SQLServer, etc.).

The unique column type 142 stores a column type defined by each database management system.

The common column type 143 stores information showing a column type for commonly treating data type being unique for each database management system and corresponding to the column type stored in the unique column type 142.

FIG. 5 shows the column list 12.

The column list 12 shows information of a list of columns which exist in all the tables. The column list 12 includes a column number 121, a column type 122, a size 123, a scale 124, and a number of appearances 125.

The list generating unit 10 inputs the table list 11 and the column correspondence table 14 and generates the column list 12. Here, the list generating unit 10 treats columns as the same columns if the column type, the size, and the scale are the same, and generates the column list 12.

The list generating unit 10 obtains the column type 116, the size 117, and the scale 118 of each column node 112 sequentially from the top table node 111 of the table list 11. Next, the list generating unit 10 converts the obtained column type 116 to a common column type 143 according to the column correspondence table 14. Then, the list generating unit 10 adds a new record to the column list 12. The list generating unit 10 stores an arbitrary value in the column number 121 of the added record, the obtained common column type 143 in the column type 122, the obtained size 117 in the size 123, the obtained scale 118 in the scale 124, and 1 in the number of appearances 125.

Here, if the same column already exists in the column list 12, the list generating unit 10 increments the number of appearances 125 of the column.

FIG. 6 shows the frequently appearing column list 13.

The frequently appearing column list 13 is information of columns whose frequency of appearance is high among a plurality of columns shown by the column list 12. The frequently appearing column list 13 includes an order of appearance 131, a column number 132, a number of appearances 133, and an appearance rate 134.

The list generating unit 10 inputs the column list 12 and generates the frequently appearing column list 13. The list generating unit 10 defines a minimum appearance rate and generates the frequently appearing column list 13 by sorting columns having at least minimum appearance rate in an order of appearance rate. Here, the minimum appearance rate is 2.0%.

Here, the appearance rate means a proportion of tables including that column to all tables. Namely, "the appearance rate"="the number of tables including the column"/"the number of all tables".

Next, an operation of a semantic classifying unit 20 will be explained.

Figure 7:
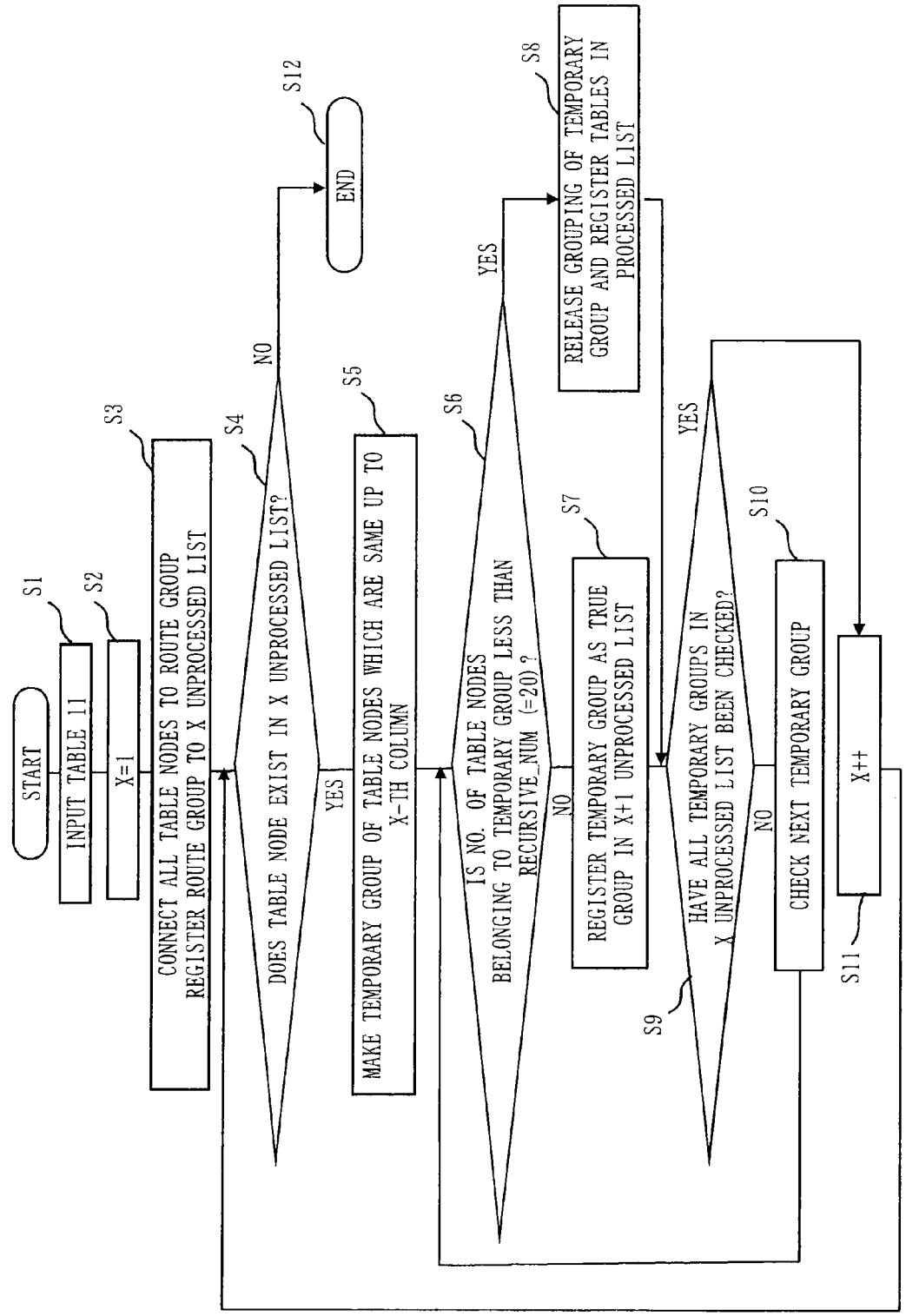
FIG. 7 is a flowchart showing an operation of a semantic classifying unit 20.

FIG. 7 is a flowchart showing the operation of the semantic classifying unit 20.

The semantic classifying unit 20 classifies tables including the top some (a prescribed number of) columns of the same column type, size, and scale into the same group. This is because the probability is high that the top some columns are key items, and also important columns semantically.

Here, in the following explanation, RECURSIVE_NUM is a parameter to determine how precisely the classification is done by the semantic classification method. For example, in the following explanation, RECURSIVE_NUM is defined to be 20. When RECURSIVE_NUM is defined to be 20, if the number of tables belonging to one group exceeds 20, such a group is tried to be classified further in detail.

<S1>: The semantic classifying unit 20 inputs the table list 11 and starts the processing. Here, it is assumed that the table node 111 of the table list 11 has been sorted by the column type 116, the size 117, and the scale 118 of the column node 112, which form the table node 11.

<S2>: The semantic classifying unit 20 assigns 1 to a variable X. The variable X determines how many same columns 112 from the top included in the table nodes 111, based on which the table nodes 111 are classified into the same group. That is, if the variable X is 1, the table nodes 111 whose top one column node 112 is the same are classified into the same group.

<S3>: The semantic classifying unit 20 connects all the table nodes 111 to a virtual route group. Further, the semantic classifying unit 20 registers the route group in an X unprocessed list.

<S4>: The semantic classifying unit 20 determines if there exists any node registered in the X unprocessed list. If no node is registered in the unprocessed list (NO at S4), the semantic classifying unit 20 proceeds to <S12> and finishes the processing. On the other hand, if there exists a node registered in the unprocessed list (YES at S4), the semantic classifying unit 20 proceeds to <S5>.

<S5>: The semantic classifying unit 20 makes a temporary group of the table nodes 111 which are the same from the top up to the X-th column node 112 within the group.

Here, the semantic classifying unit 20 converts the column type 116 (a column type unique to the database) of the column node 112 into the common column type 143 using the column correspondence table 14 in order to compare the column nodes 112 to check if they are the same or not. Next, the semantic classifying unit 20 obtains the column number 121 from the column list 12 based on the converted common column type 143, the size 117 and the scale 118 of the column node 112. Then, the semantic classifying unit 20 compares the obtained column numbers 121 to check if they are the same or not, and determines if the column nodes 112 are the same or not.

<S6>: The semantic classifying unit 20 determines if the number of the table nodes 111 included in the temporary group is less than RECURSIVE_NUM or not. If the number of the table nodes 111 is at least RECURSIVE_NUM (NO at S6), the semantic classifying unit 20 proceeds to <S7>. On the other hand, the number of the table nodes 111 is less than RECURSIVE_NUM (YES at S6), and the semantic classifying unit 20 proceeds to <S8>.

<S7>: The semantic classifying unit 20 makes a true group from the temporary group of which the number of the table node 111 is at least RECURSIVE_NUM. Namely, the temporary group of which the number of the table nodes 111 is at least RECURSIVE_NUM is made as a true group instead of a temporary group. Further, the semantic classifying unit 20 registers the true group in an X+1 unprocessed list. By registering in the X+1 unprocessed list, the grouped table nodes 111 become a target for further classification.

<S8>: On the other hand, the semantic classifying unit 20 releases grouping of the temporary group of which the number of the table nodes 111 is less than RECURSIVE_NUM. Namely, the temporary group of which the number of the table nodes 111 is less than RECURSIVE_NUM is not grouped. The table nodes 111 belonging to the temporary group are connected to the processed list. Namely, grouping of the table nodes 111 which have not been grouped is finished.

<S9>: The semantic classifying unit 20 determines whether all the temporary groups connected to the X unprocessed list have been processed or not. If all the temporary groups have not been processed (NO at S9), the semantic classifying unit 20 proceeds to <S10>. On the other hand, if all the temporary groups have been processed (YES at S9), the semantic classifying unit 20 proceeds to <S11>.

<S10>: Since all the temporary groups have not been processed, the semantic classifying unit 20 carries out the processing for the next temporary group.

<S11>: On the other hand, since all the temporary groups have been processed, the semantic classifying unit 20 increments (+1) X and returns to <S4>. Namely, the semantic classifying unit 20 groups further the grouped table nodes 111.

<S12>: The semantic classifying unit 20 finishes the processing.

Next, with reference to FIGS. 8 through 12, an example of the operation of the semantic classifying unit 20 will be explained. FIGS. 8 through 12 are drawings for explaining table classification by the semantic classifying unit 20.

At <S1>, the semantic classifying unit 20 inputs the table list 11 and starts the processing. Here, each table node 111 has been sorted by the column type 116, the size 117, and the scale 118 of the column node 112 which form the table node 111.

Next, at <S2>, the semantic classifying unit 20 assigns 1 to a variable X.

Figure 8:
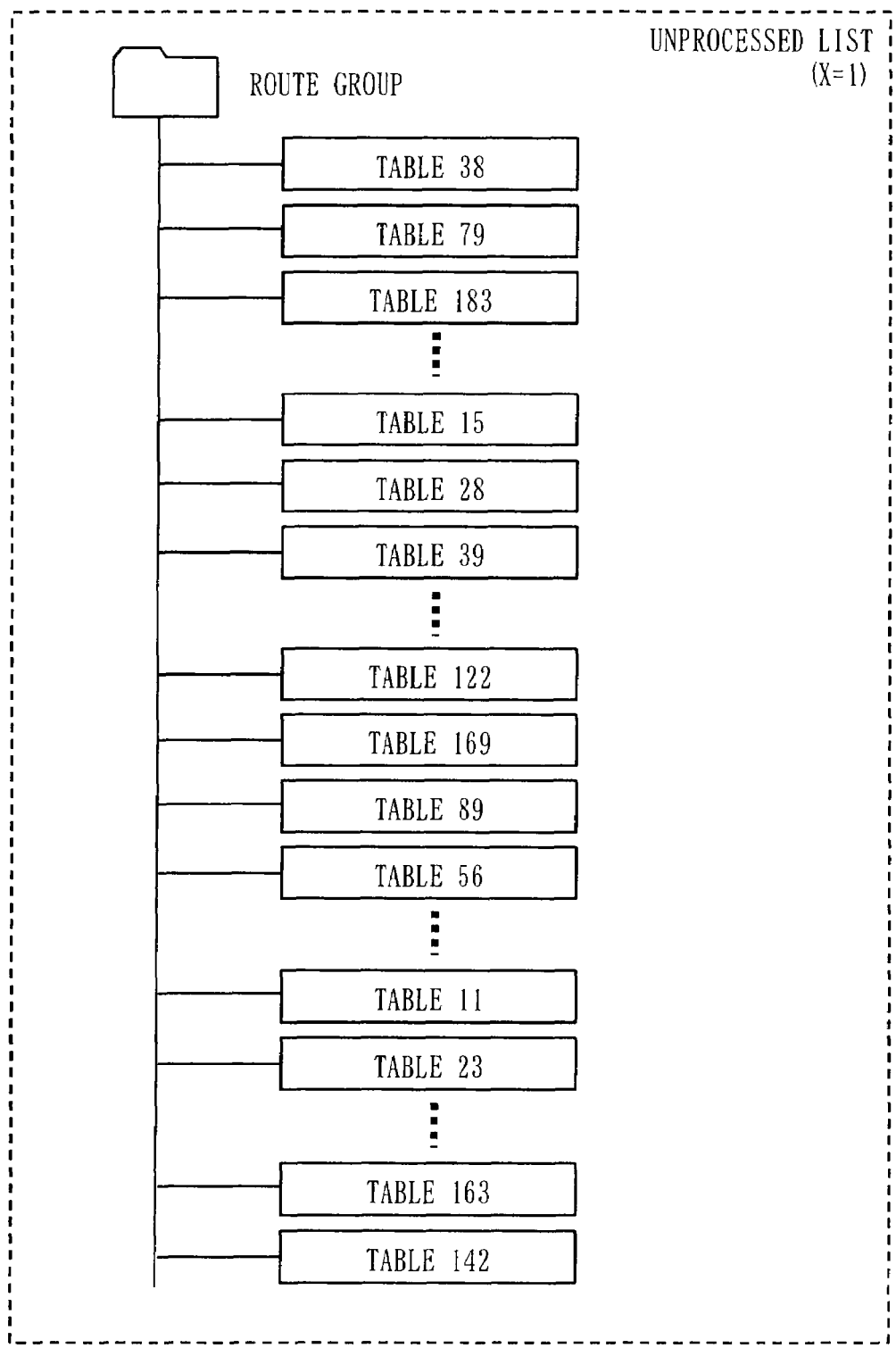
FIG. 8 is an explanatory drawing (1) of table classification by the semantic classifying unit 20.

Next, at <S3>, the semantic classifying unit 20 connects all the table nodes 111 to a virtual route group. Further, the semantic classifying unit 20 registers the route group in an X unprocessed list. Namely, as shown in FIG. 8, each table node 111 shown by the table list 11 is connected to the route group. Further, since the route group is registered in the X (=1) unprocessed list, all table nodes 111 are in the status of being registered in the X (=1) unprocessed list.

Next, at <S4>, the semantic classifying unit 20 determines if there exists any node connected to the X unprocessed list. Here, since the table node 111 shown in FIG. 8 is connected to the unprocessed list, the operation proceeds to <S5>.

At <S5>, the semantic classifying unit 20 makes a temporary group of the table nodes 111 which are the same from the top up to the X(=1)-th column node 112 in the group.

Figure 9:
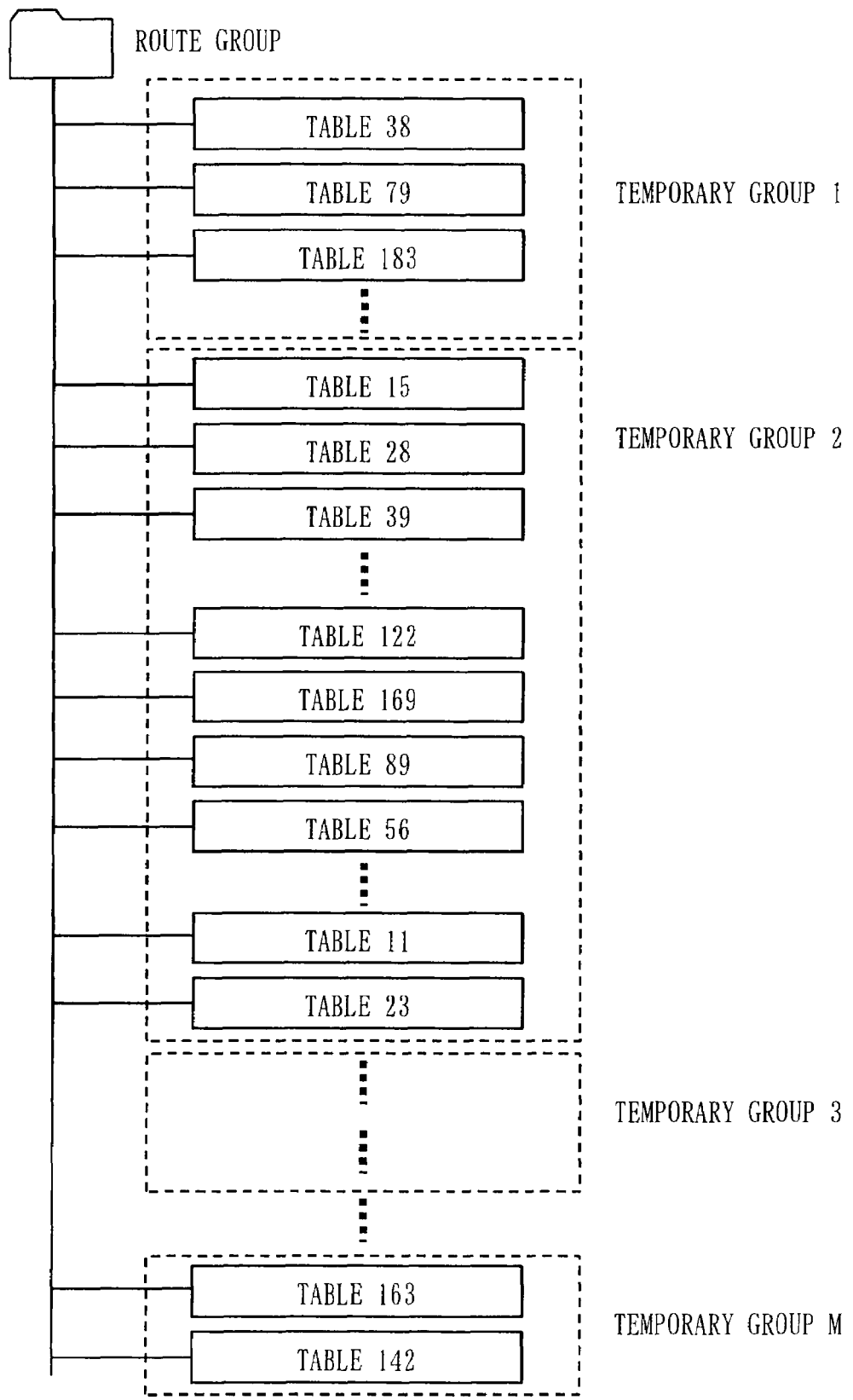
FIG. 9 is an explanatory drawing (2) of table classification by the semantic classifying unit 20.

Here, since X is 1. the table nodes 111 whose one top column node 112 is the same are classified to the same temporary group. As shown in FIG. 9, it is assumed that they are classified into M temporary groups.

Next, the semantic classifying unit 20 repeats steps of <S6> to <S11> to determine sequentially if the number of the table nodes 111 included in each temporary group is less than RECURSIVE_NUM (=20) or not. The semantic classifying unit 20 registers the temporary group of which the number of the table nodes is at least RECURSIVE_NUM as a true group in the X+1 unprocessed list, releases grouping of the temporary groups of which the number of the table nodes is less than RECURSIVE_NUM to register in the processed list.

Figure 10:
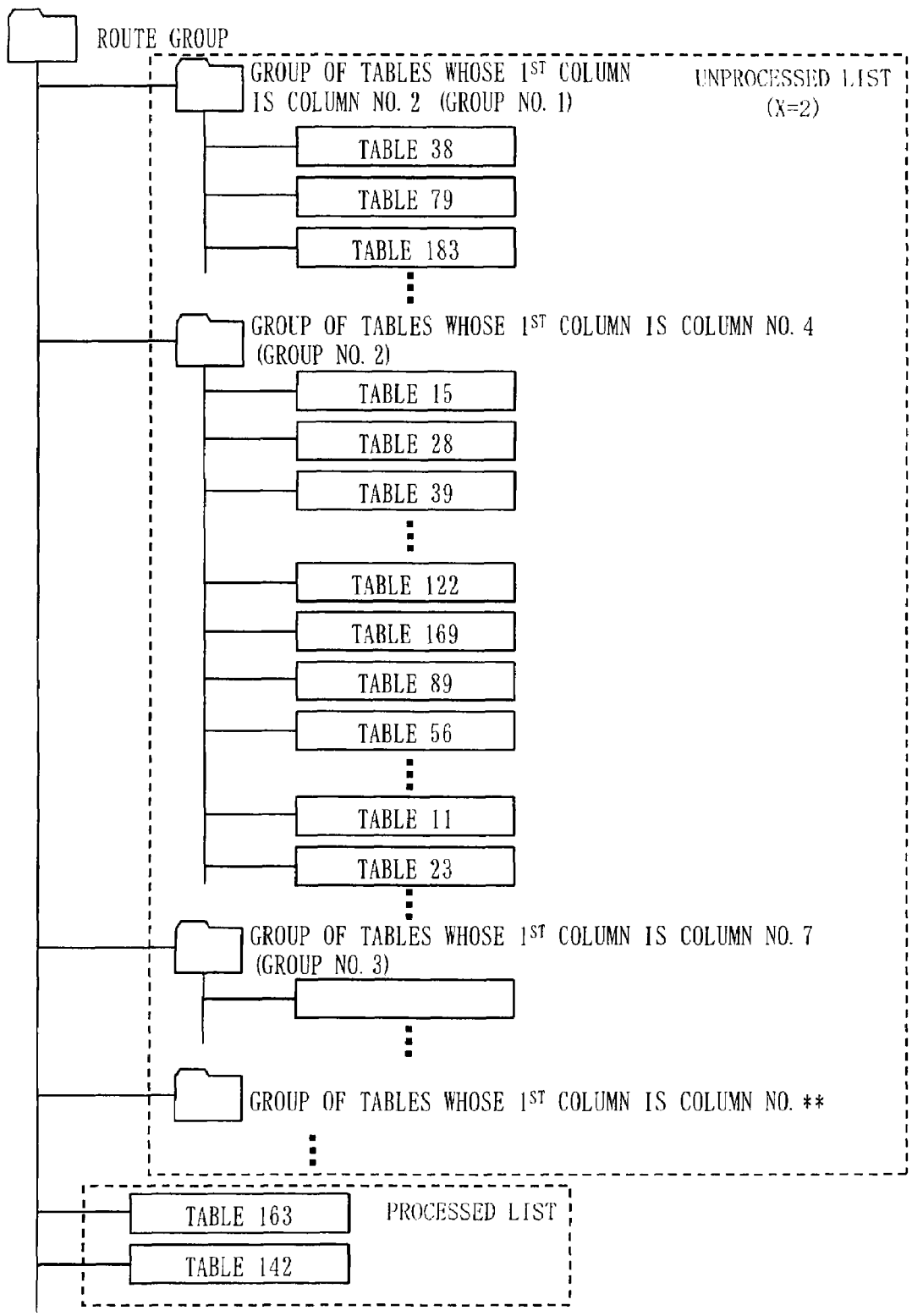
FIG. 10 is an explanatory drawing (3) of table classification by the semantic classifying unit 20.

Here, it is assumed that the number of table nodes 111 of the temporary groups 1, 2, 3 . . . is at least RECURSIVE_NUM, and the number of table nodes 111 of the temporary group M is less than RECURSIVE_NUM. Namely, the temporary groups 1, 2, 3 . . . are grouped as the true groups. On the other hand, the temporary group M does not become a true group but treated as processed. Namely, as shown in FIG. 10, each true group is connected to the route group, and the table nodes 111 belonging to the true group are connected to each true group. Further, the table nodes 111 belonging to the temporary group M which does not become the true group become processed, with maintaining connected to the route group (that is, without being grouped).

Here, each true group connected to the route group is registered in the X+1 (=2) unprocessed list, and the table nodes 111 connected to the route group, with maintaining connected, are registered in the processed list.

Next, at <S11>, the semantic classifying unit 20 increments (+1) X and the operation returns to <S4>.

Figure 11:
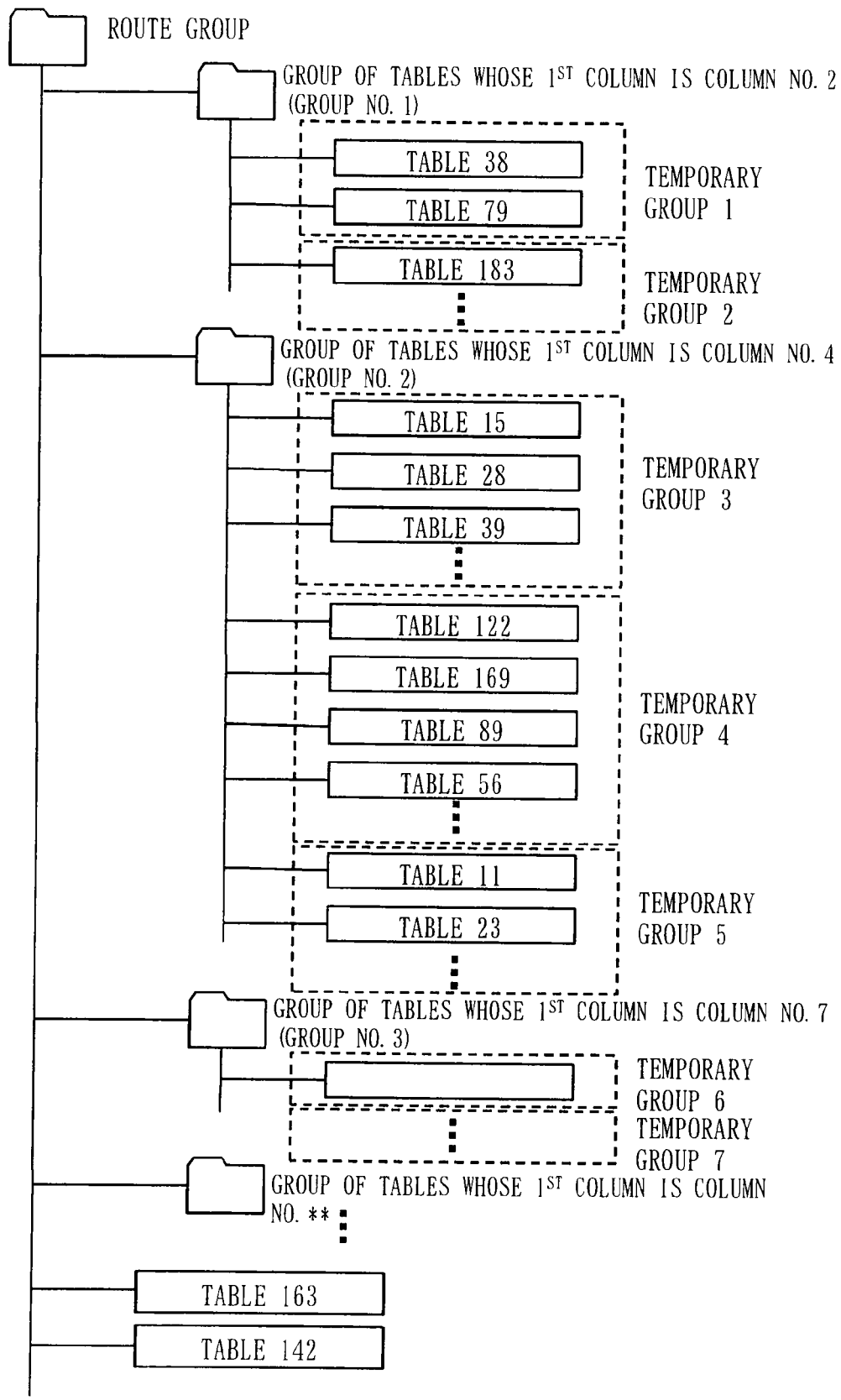
FIG. 11 is an explanatory drawing (4) of table classification by the semantic classifying unit 20.

At <S4>, since a node is registered in the X (=2) unprocessed list, the semantic classifying unit 20 proceeds to <S5>. At <S5>, since X is 2. the semantic classifying unit 20 classifies the table nodes 111 of which top two column nodes 112 are the same to one temporary group. Namely, as shown in FIG. 11, the table nodes 111 connected to each true group are classified to some temporary groups. That is, hierarchical classification is implemented by incrementing X and further classifying each true group. Next, the semantic classifying unit 20 repeats steps of <S6> to <S10> to determine if the number of table nodes 111 belonging to each temporary group is less than RECURSIVE_NUM or not. According to the determination result, the semantic classifying unit 20 decides whether to classify each temporary group as a true group or to treat as processed. Then, after the processing for all temporary groups have been completed, the semantic classifying unit 20 classifies the next hierarchy. Finally, when no temporary group includes the table nodes 111, the number of which is at least RECURSIVE_NUM, the operation ends.

Figure 12:
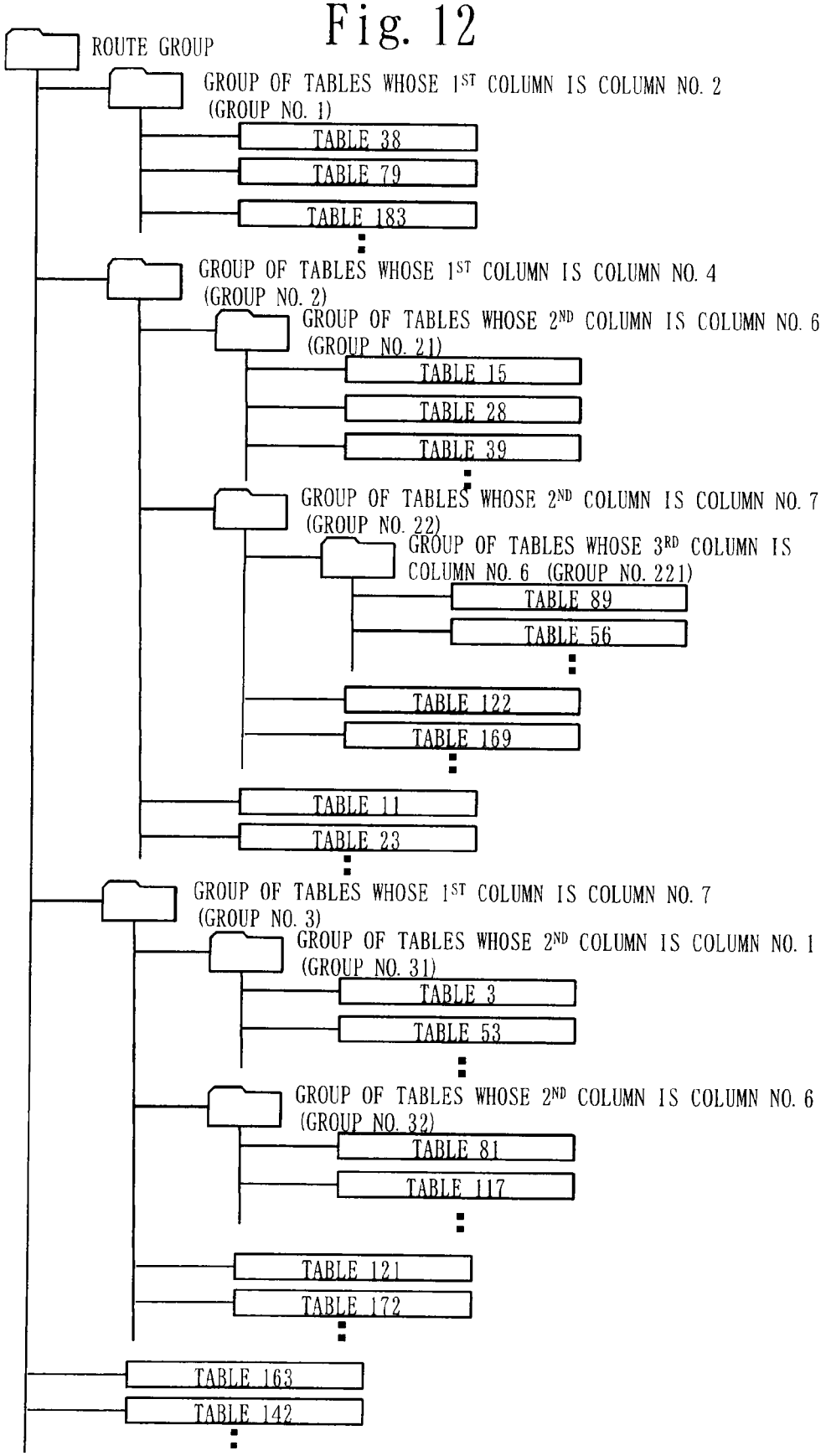
FIG. 12 is an explanatory drawing (5) of table classification by the semantic classifying unit 20.

Here, for example, the table nodes 111 are classified as shown in FIG. 12. FIG. 13 shows a table semantic classification table 21 representing classification of the table nodes 111 shown in FIG. 12.

The table semantic classification table 21 includes a list of a group number to identify the group, a column number of the first column node 112, a column number of the second column, . . . , and a column number of the N-th column, which are common to table nodes 111 belonging to the group, and an identifier of the table nodes 111 belonging to the group.

Here, up to which column node 112 from the top the table nodes are grouped is decided by a value of X, which is to be less than RECURSIVE_NUM in the flowchart of FIG. 7, and it varies for each group.

For example, the group of the group number 1 is a group composed of the table nodes 111, whose first (the top) column node 112 is the table nodes 111 of the column number 2. Since the number of the table nodes 111 whose first (the top) column node 112 is the column number 2 is at least RECURSIVE_NUM (=20), this group is grouped. However, in the group of the group number 1, the number of table nodes 111, which are the same up to the second (the second from the top) column node 112, is less than RECURSIVE_NUM (=20), the grouping is finished up to the grouping by the first (the top) column node 112.

Further, for example, the group of the group number 2 is a group composed of the table nodes 111 whose first column node 112 is the column number 4. Since the number of the table nodes 111 whose first column node 112 is the column number 4 is at least RECURSIVE_NUM, this group is grouped.

Further, the number of the table nodes 111 whose second column node 112 is the column number 6 and the number of the table nodes 111 whose second column node 112 is the column number 7 are at least RECURSIVE_NUM (=20). Therefore, the group of the group number 2 is further grouped into groups of the group number 21 and the group number 22. However, the number of the table nodes 111 whose second column node 112 is other than the column number 6 or 7 is less than RECURSIVE_NUM (=20). Therefore, the table nodes 111 whose second column node 112 is other than the column number 6 or 7 is not grouped further, and the grouping is finished up to the grouping by the first column node 112.

Further, in the group of the group number 21, the number of the table nodes 111 which are the same up to the third (the third from the top) column node 112 is less than RECURSIVE_NUM (=20), the grouping is finished up to the grouping by the second (the top) column node 112.

In the group of the group number 22, the number of the table nodes 111 whose third column node 112 is the column number 6 is at least RECURSIVE_NUM (=20). Therefore, the group of the group number 22 is further grouped as a group of the group number 221. However, the number of the table nodes 111 whose third column node 112 is other than the column number 6 is less than RECURSIVE_NUM (=20) in any case. Therefore, the table nodes 111 whose third column node 112 is other than the column number 6 are not grouped further, but the grouping is finished up to the grouping by the second column node 112.

In the group of the group number 221, the number of the table nodes 111 which are the same up to the fourth (the fourth from the top) column node 112 is less than RECURSIVE_NUM (=20), the grouping is finished up to the grouping by the third (the top) column node 112.

Next, an operation of a statistical classifying unit 30 will be explained.

Figure 14:
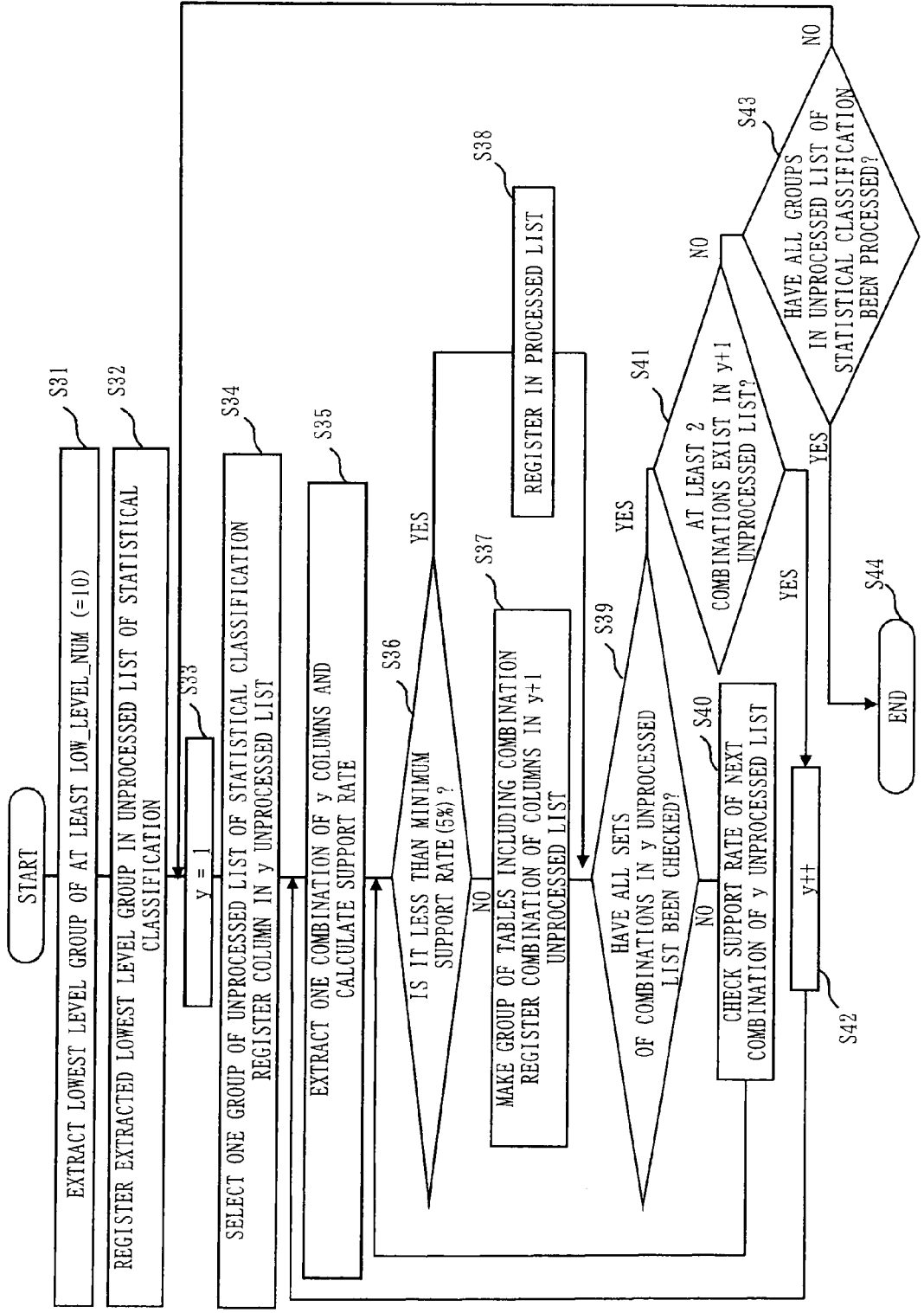
FIG. 14 is a flowchart showing an operation of a statistical classifying unit 30.

FIG. 14 is a flowchart showing the operation of the statistical classifying unit 30.

Here, the statistical classifying unit 30 classifies the tables having the same column, of which the appearance rate is high and which is registered in the frequently appearing column list 13, into the same group. This is because the column of which the appearance rate is high is considered to be an important column in the database.

<S31>: The statistical classifying unit 30 inputs the table semantic classification table 21 and extracts the lowest level group of which the number of table nodes 111 belonging to each group is at least LOW_LEVEL_NUM (10. for example).

The lowest level group means a group which has no lower level group in the grouping by the semantic classifying unit 20. Namely, in the table semantic classification table 21 shown in FIG. 13, the lowest level groups are the groups of the group number 1, the group number 21, the group number 221, . . .

<S32>: The statistical classifying unit 30 registers all the groups extracted at <S31> in an unprocessed list of statistical classification.

<S33>: The statistical classifying unit 30 assigns 1 to a variable y.

<S34>: The statistical classifying unit 30 selects one unprocessed group which is registered in the unprocessed list of statistical classification.

Further, the statistical classifying unit 30 extracts all column numbers of the column nodes 112 belonging to the table nodes 111 of the selected group. Further, the statistical classifying unit 30 extracts an extracted column number which is registered in the frequently appearing column list 13. Then, the statistical classifying unit 30 registers the extracted column number in a y unprocessed list.

<S35>: The statistical classifying unit 30 extracts one combination of y columns (a combination of y column numbers) from the y unprocessed list. The statistical classifying unit 30 calculates an appearance rate of the combination of y columns (a support rate, hereinafter) in each table node 111 belonging to the selected group. Here, the support rate is a rate at which an extracted combination of the column nodes 112, except the top column node 112 which is used for grouping of the group, appears in the selected group.

<S36>: The statistical classifying unit 30 checks if the support rate calculated at <S35> is less than the minimum support rate (5%, for example). If it is equal to or greater than the minimum support rate (NO at S36), the statistical classifying unit 30 proceeds to <S37>. If less than the minimum support rate (YES at S36), the statistical classifying unit 30 proceeds to <S38>.

<S37>: The statistical classifying unit 30 groups the table nodes 11 including the combination of columns of which the support rate is equal to or greater than the minimum support rate. Then, the statistical classifying unit 30 registers the combination of columns in y+1 unprocessed list.

<S38>: On the other hand, the statistical classifying unit 30 registers the combination of columns of which the support rate is less than the minimum support rate in the processed list.

<S39>: The statistical classifying unit 30 checks if the support rate is calculated or not for all combinations in the y unprocessed list. If the support rate is not calculated for all combinations (NO at S39), the operation proceeds to <S40>. On the other hand, if the support rate is calculated for all combinations (YES at S39), the operation proceeds to <S41>.

<S40>: The statistical classifying unit 30 calculates the support rate of the next combination and returns to <S36>.

<S41>: The statistical classifying unit 30 checks if two or more combinations exist or not in the y+1 unprocessed list. If two or more combinations exist (YES at S41), the operation proceeds to <S42>. On the other hand, two or more combinations do not exist (NO at S41), the operation proceeds to <S43>.

<S42>: The statistical classifying unit 30 increments y and returns to <S36>.

<S43>: The statistical classifying unit 30 checks if all the groups registered in the unprocessed list of statistical classification are selected at <S34> or not. If all the groups are not selected (NO at S43), the operation returns to <S33> to select an unprocessed group. On the other hand, all the groups are selected (YES at S43), the operation terminates.

In the following, with reference to FIGS. 15 through 26, an example of the operation of the statistical classifying unit 30 will be explained. FIGS. 15 through 26 explain table classification by the statistical classifying unit 30.

At <S31>, the statistical classifying unit 30 inputs the table semantic classification table 21 shown in FIG. 13, and extracts the lowest level group of which the number of the table nodes 111 belonging to each group is equal to or greater than LOW_LEVEL_NUM (10. for example).

Here, the statistical classifying unit 30 extracts the group of the group number 1, the group of the group number 21, the group of the group number 221 . . . .

Next, at <S32>, the statistical classifying unit 30 registers the groups extracted at <S31> in the unprocessed list of statistical classification.

Further, at <S33>, the statistical classifying unit 30 assigns 1 to the variable y.

Next, at <S34>, the statistical classifying unit 30 selects one unprocessed group registered in the unprocessed list of statistical classification. Here, it is assumed that the group of the group number 21 is selected.

Figure 15:
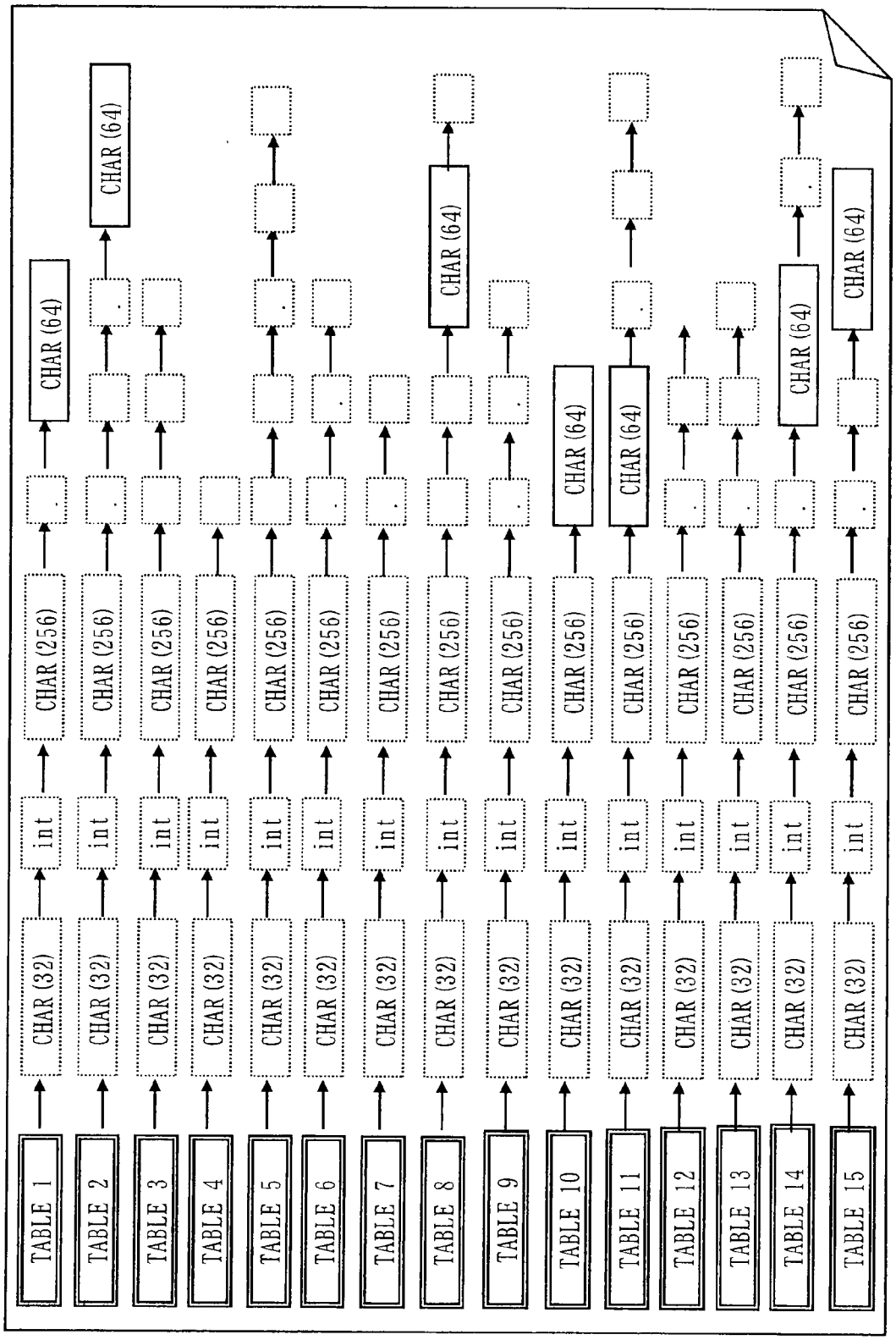
FIG. 15 is an explanatory drawing (1) of table classification by the statistical classifying unit 30.
Figure 16:
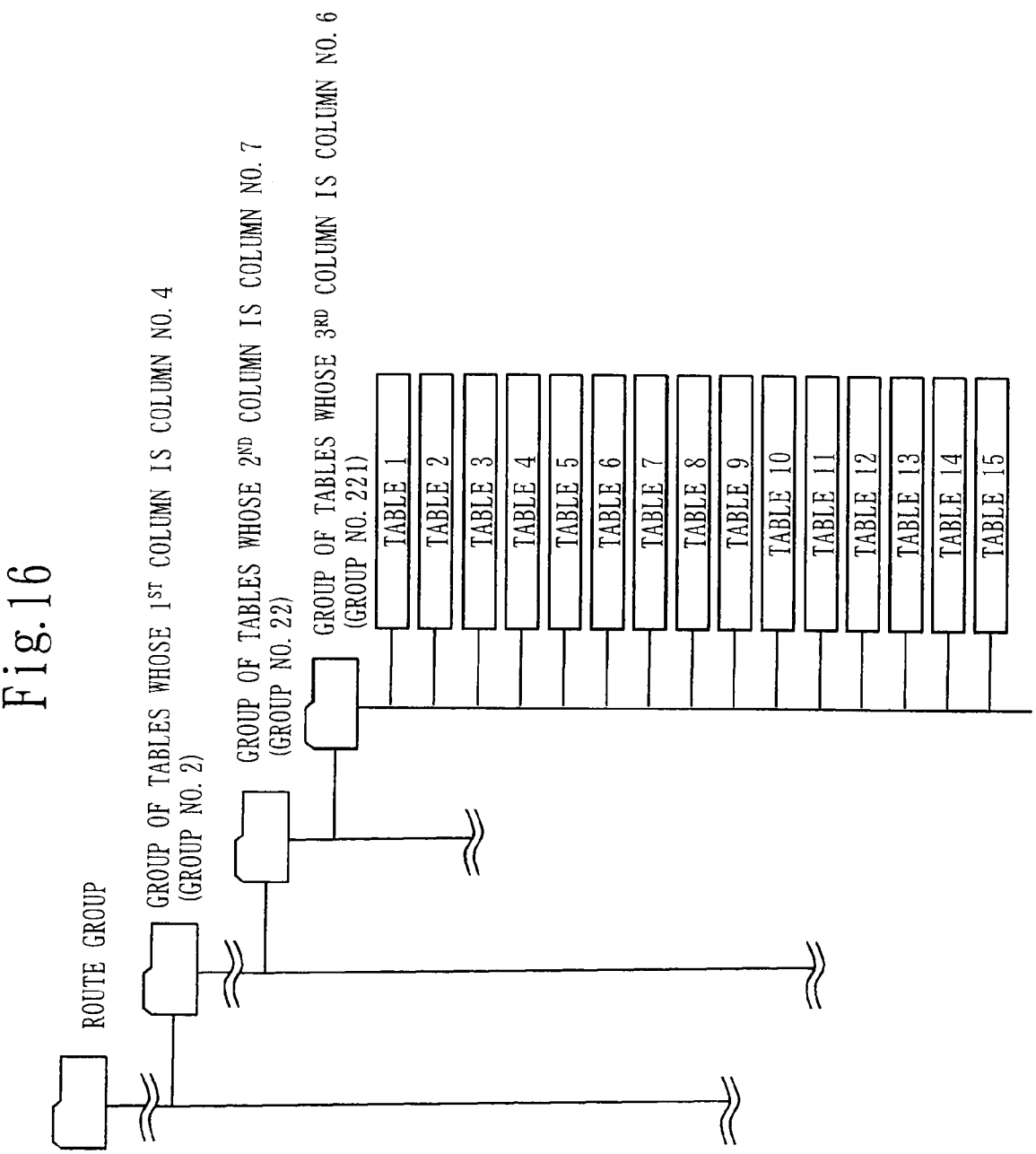
FIG. 16 is an explanatory drawing (2) of table classification by the statistical classifying unit 30.

FIG. 15 shows an example of the table node 111 belonging to the group of the group number 221 in the table semantic classification table 21. Here, in FIG. 15, in order to facilitate the explanation, identifiers of the table node 111 belonging to the group of the group number 221 are made different from the identifiers shown in FIGS. 8 through 13. Namely, in FIG. 15, fifteen table nodes 111 (TABLE 1 to TABLE 15) having the first column node 112 of the column number 4 (the column type is char(32)), the second column node 112 of the column number 7 (the column type is int), and the third column node 112 of the column number 6 (the column type is char(256)) belong to the group of the group number 221. Further, in the flowchart shown in FIG. 7, since RECURSIVE_NUM is set to 20. twenty or more table nodes 111 are essentially supposed to belong to the group of the group number 221. However, for the ease of explanation, it is assumed here that fifteen table nodes 111 belong to the group of the group number 221. Namely, it is assumed that the group of the group number 221 is formed as shown in FIG. 16.

Further, the statistical classifying unit 30 extracts all the column numbers of the column node 112 belonging to the table node 111 in the selected group, and among the extracted column numbers, further extracts the column number registered in the frequently appearing column list 13. Then, the statistical classifying unit 30 registers the extracted column number in the y unprocessed list. Here, it is assumed that the column number 5 (char(64)) is extracted as the column number registered in the frequently appearing column list. Namely, it is assumed that the column number 5 (char(64)) is registered in the y unprocessed list.

Next, at <S35>, the statistical classifying unit 30 extracts one combination of y (=1) column from they (=1) unprocessed list. Here, the column number 5 (char(64)) is extracted.

Figure 17:
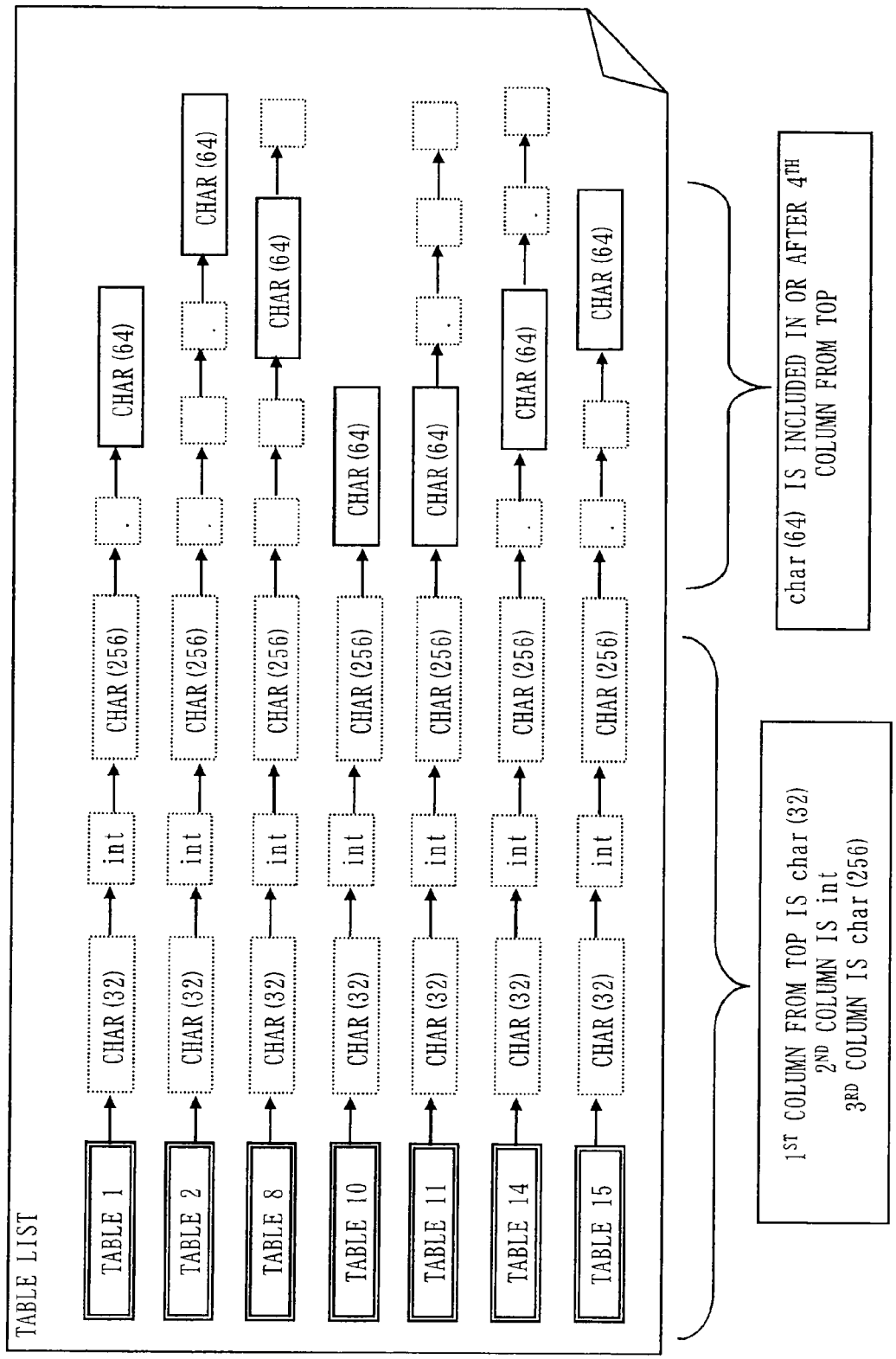
FIG. 17 is an explanatory drawing (3) of table classification by the statistical classifying unit 30.

Further, the statistical classifying unit 30 calculates the support rate of the column number 5 (char(64)). Among fifteen table nodes 111 shown in FIG. 15, seven table nodes 111 include the column node 112 of column number 5 (char(64)). Therefore, the support rate is "7/15=46.7%". Here, since this group has been grouped using the column nodes 112 up to the third column node from the top, the support rate is calculated as a rate of the table nodes 111 including the column number 5 (char(64)) in or after the fourth column node 112. Here, FIG. 17 shows the table nodes 111 including the column number 5 (char(64)) out of fifteen table nodes 111 belonging to the group of the group number 221.

Next, at <S36>, the statistical classifying unit 30 determines if the support rate calculated at <S35> is less than the minimum support rate or not. Here, since the minimum support rate is set to 5%, the support rate of the column number 5 (char(64)) exceeds the minimum support rate (NO at S36). Therefore, the operation proceeds to <S37>.

At <S37>, the statistical classifying unit 30 groups the table nodes 111 including the column number 5 (char(64)). Further, the column number 5 (char(64)) is registered in the y+1 unprocessed list.

Figure 18:
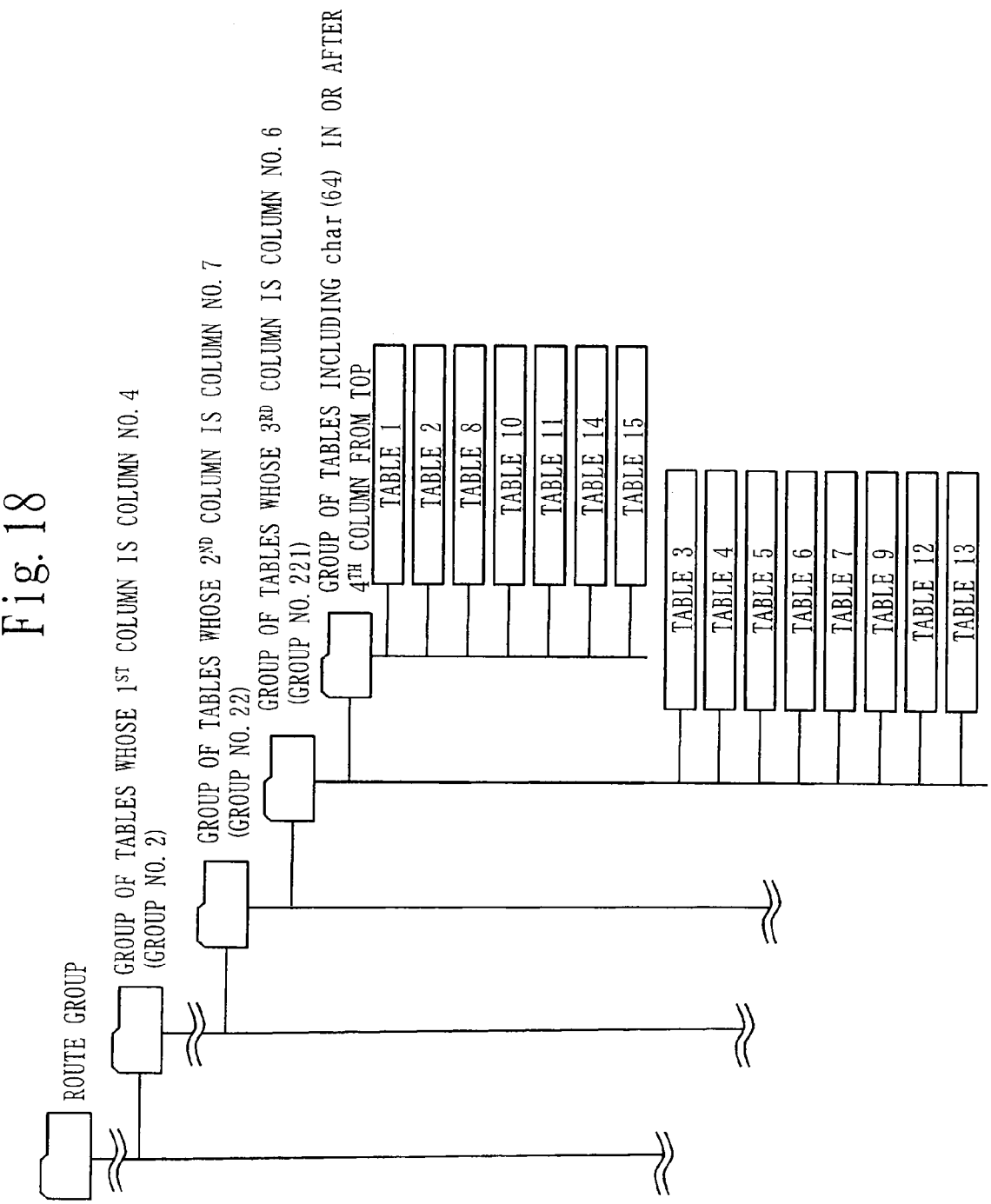
FIG. 18 is an explanatory drawing (4) of table classification by the statistical classifying unit 30.

Namely, as shown in FIG. 18, the group of the group number 221 is further grouped. That is, a group of the table nodes 111 including the column number 5 (char(64)) is formed within the group of the group number 221.

At <S39>, since the support rate has been calculated for all combinations, the operation of the statistical classifying unit 30 proceeds to <S41>. Further, at <S41>, since two or more combinations do not exist in the y+1 unprocessed list, the operation of the statistical classifying unit 30 proceeds to <S43>. Namely, the processing for the group of the group number 221 terminates.

At <S43>, since unselected groups exist, the operation of the statistical classifying unit 30 returns to <S33> to carry out the processing for the groups other than the group number 221.

Subsequently, at <S33>, the statistical classifying unit 30 assigns 1 to the variable y once again.

Next, at <S34>, the statistical classifying unit 30 selects one unprocessed group registered in the unprocessed list of statistical classification. Here, it is assumed that the group of the group number 32 is selected.

Figure 19:
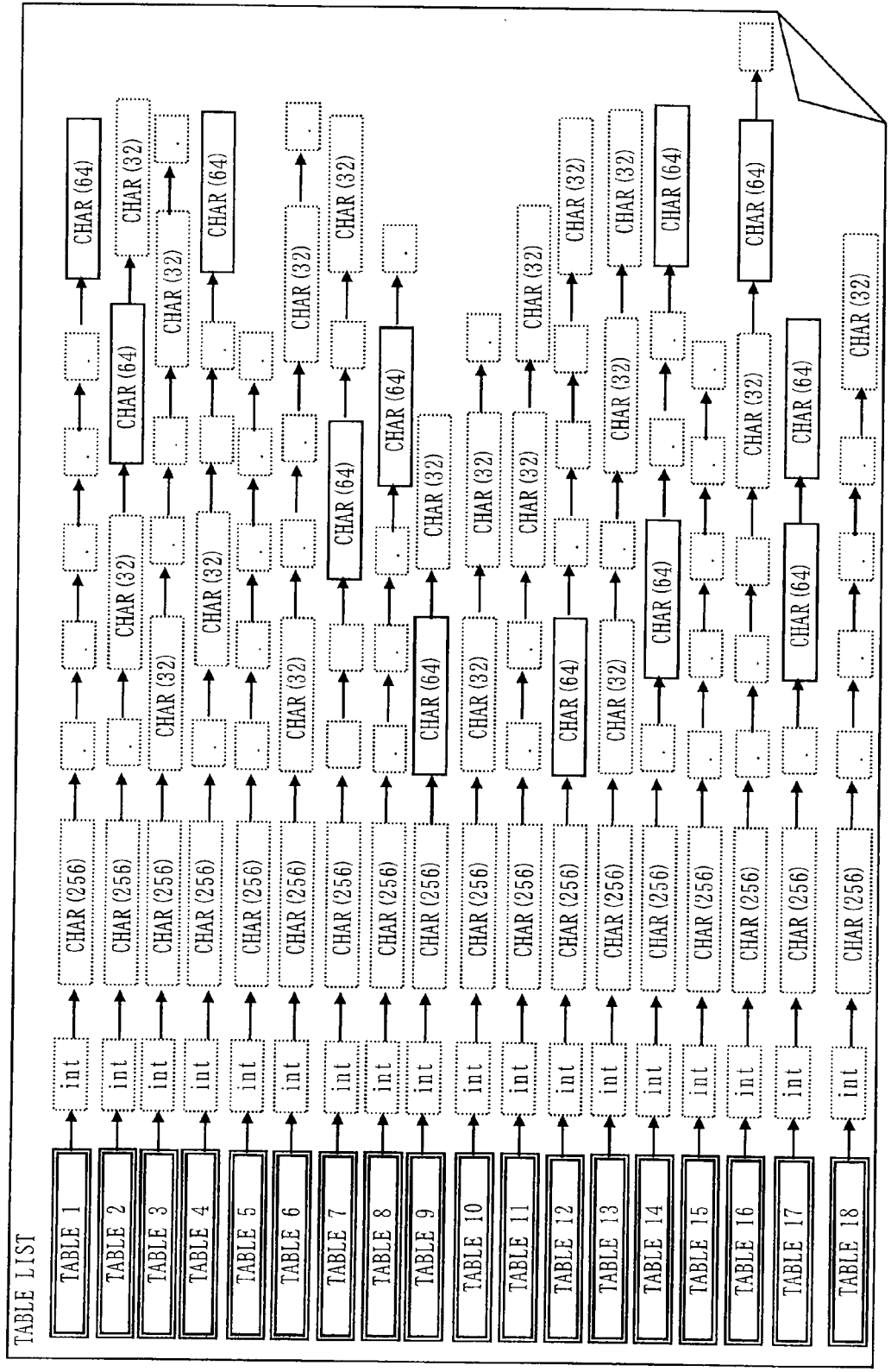
FIG. 19 is an explanatory drawing (5) of table classification by the statistical classifying unit 30.
Figure 20:
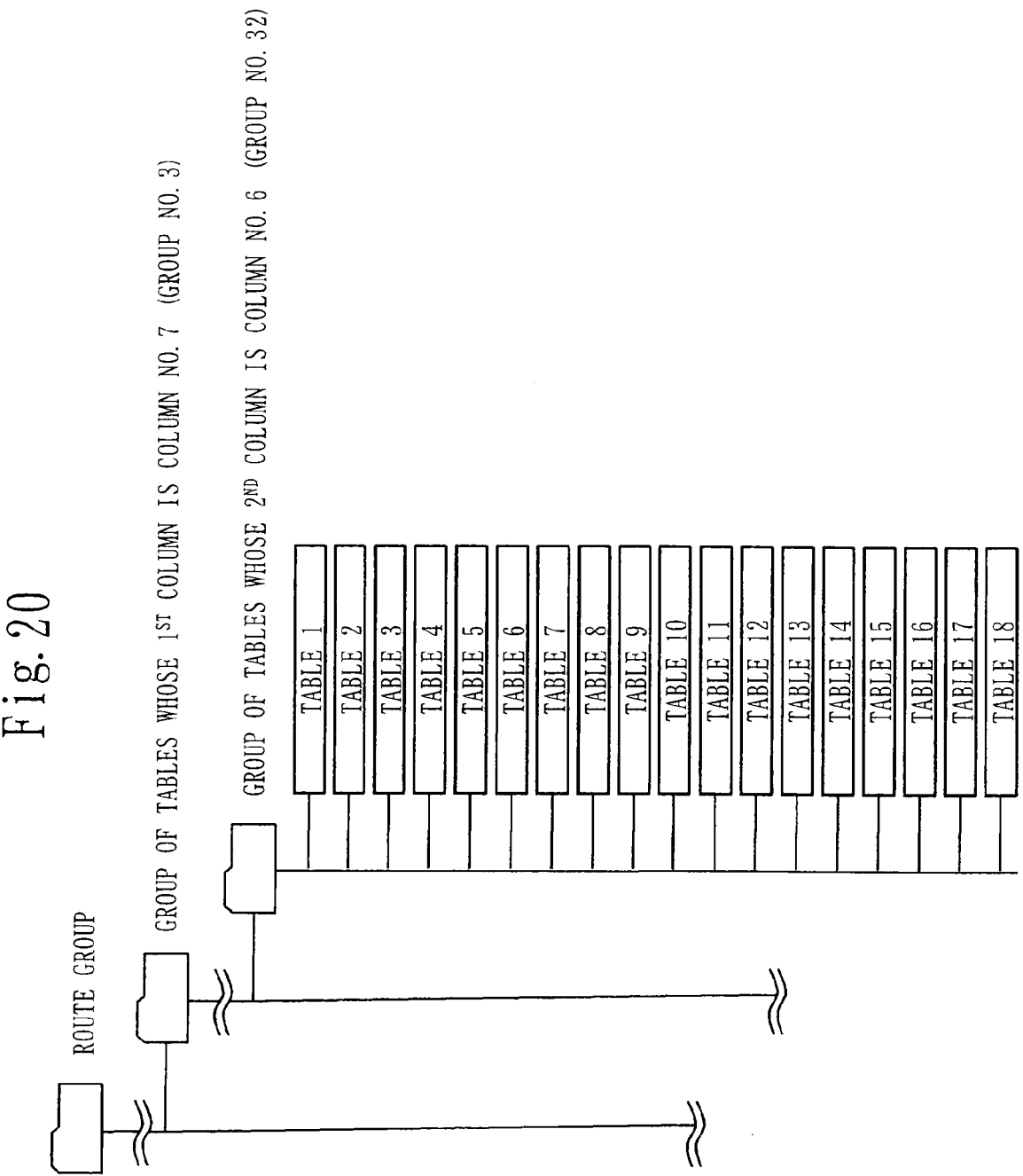
FIG. 20 is an explanatory drawing (6) of table classification by the statistical classifying unit 30.

FIG. 19 shows an example of the table nodes 111 belonging to the group of the group number 32 in the table semantic classification table 21. Here, in FIG. 19, in order to facilitate the explanation, identifiers of the table node 111 belonging to the group of the group number 32 are made different from the identifiers shown in FIGS. 8 through 13. Namely, in FIG. 19, eighteen table nodes 111 (TABLE 1 to TABLE 18) having the top column node 112 of the column number 7 (the column type is int), the second column node 112 of the column number 6 (the column type is char(256)) belong to the group of the group number 32. Further, in the flowchart shown in FIG. 7, since RECURSIVE_NUM is set to 20, twenty or more table nodes 111 are essentially supposed to belong to the group of the group number 32. However, for the ease of explanation, it is assumed that eighteen table nodes 111 belong to the group of the group number 32 here. Namely, it is assumed that the group of the group number 32 is formed as shown in FIG. 20.

Further, it is assumed that the column number 4 (char(32)) and the column number 5 (char(64)) are extracted as the column number registered in the frequently appearing column list. Namely, it is assumed that the column number 4 (char(32)) and the column number 5 (char(64)) are registered in the y unprocessed list.

Next, at <S35>, the statistical classifying unit 30 extracts one combination of y (=1) column from the y (=1) unprocessed list. Here, the column number 4 (char(32)) is extracted.

Figure 21:
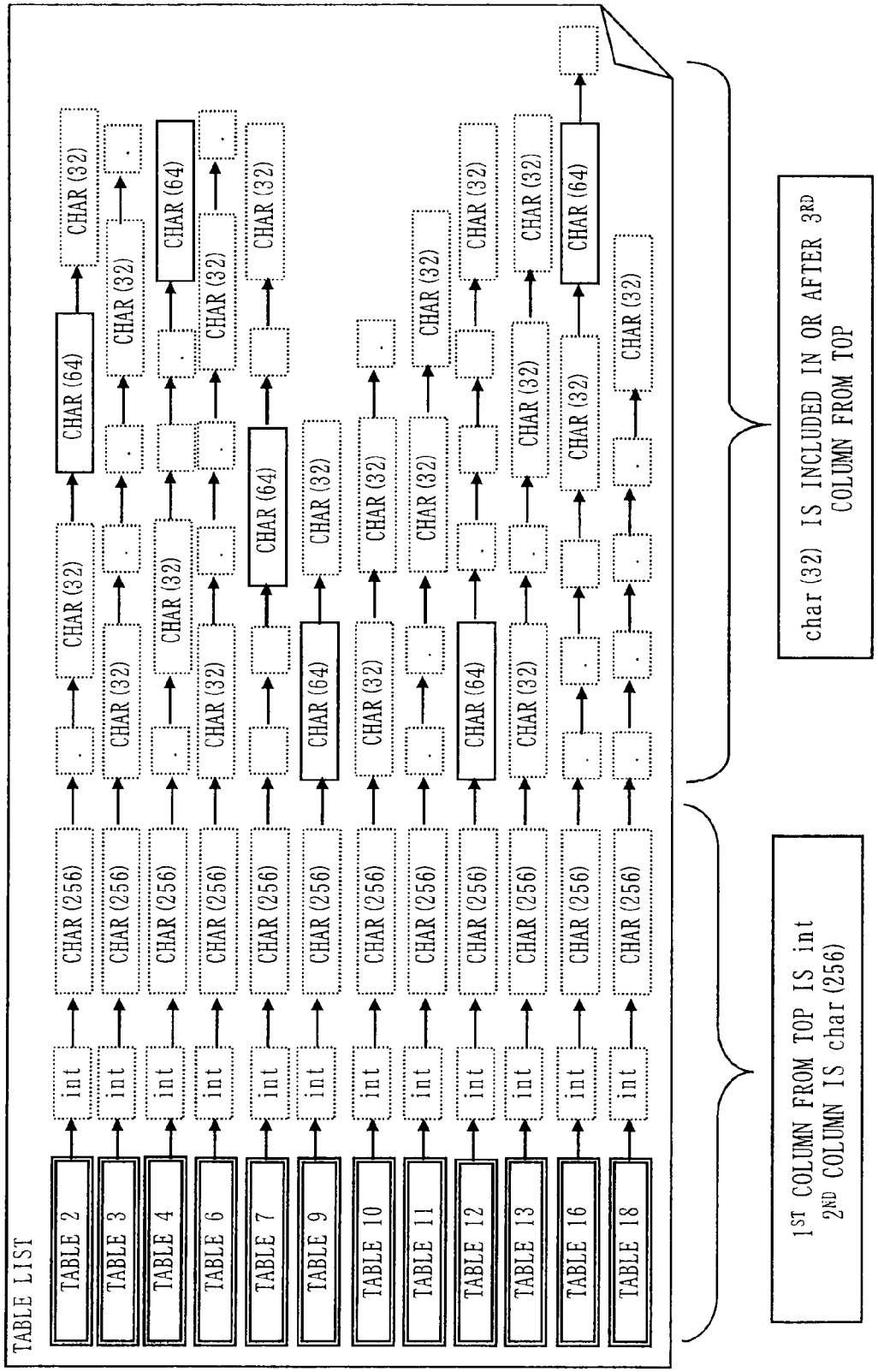
FIG. 21 is an explanatory drawing (7) of table classification by the statistical classifying unit 30.

Further, the statistical classifying unit 30 calculates the support rate of the column number 4 (char(32)). Among eighteen table nodes 111 shown in FIG. 19, twelve table nodes 111 include the column node 112 of the column number 4 (char (32)). Therefore, the support rate is "12/18=67%". Here, since this group has been grouped using the column nodes 112 up to the second column node from the top, the support rate is calculated as a rate of the table nodes 111 including the column number 4 (char(32)) in or after the third column node 112. Here, FIG. 21 shows the table nodes 111 including the column number 4 (char(32)) out of eighteen table nodes 111 belonging to the group of the group number 32.

Next, at <S36>, the statistical classifying unit 30 determines if the support rate calculated at <S35> is less than the minimum support rate or not. Here, since the minimum support rate is set to 5%, the support rate (67%) of the column number 4 (char(32)) exceeds the minimum support rate (5%) (NO at S36). Therefore, the operation proceeds to <S37>.

At <S37>, since the support rate is equal or greater than the minimum support rate, the table nodes 111 including the column number 4 (char(32)) are grouped. Further, the column number 4 (char(32)) is registered in the y+1 (=2) unprocessed list.

At <S39>, since the support rate has not been calculated for all combinations, the operation proceeds to <S40>.

Figure 22:
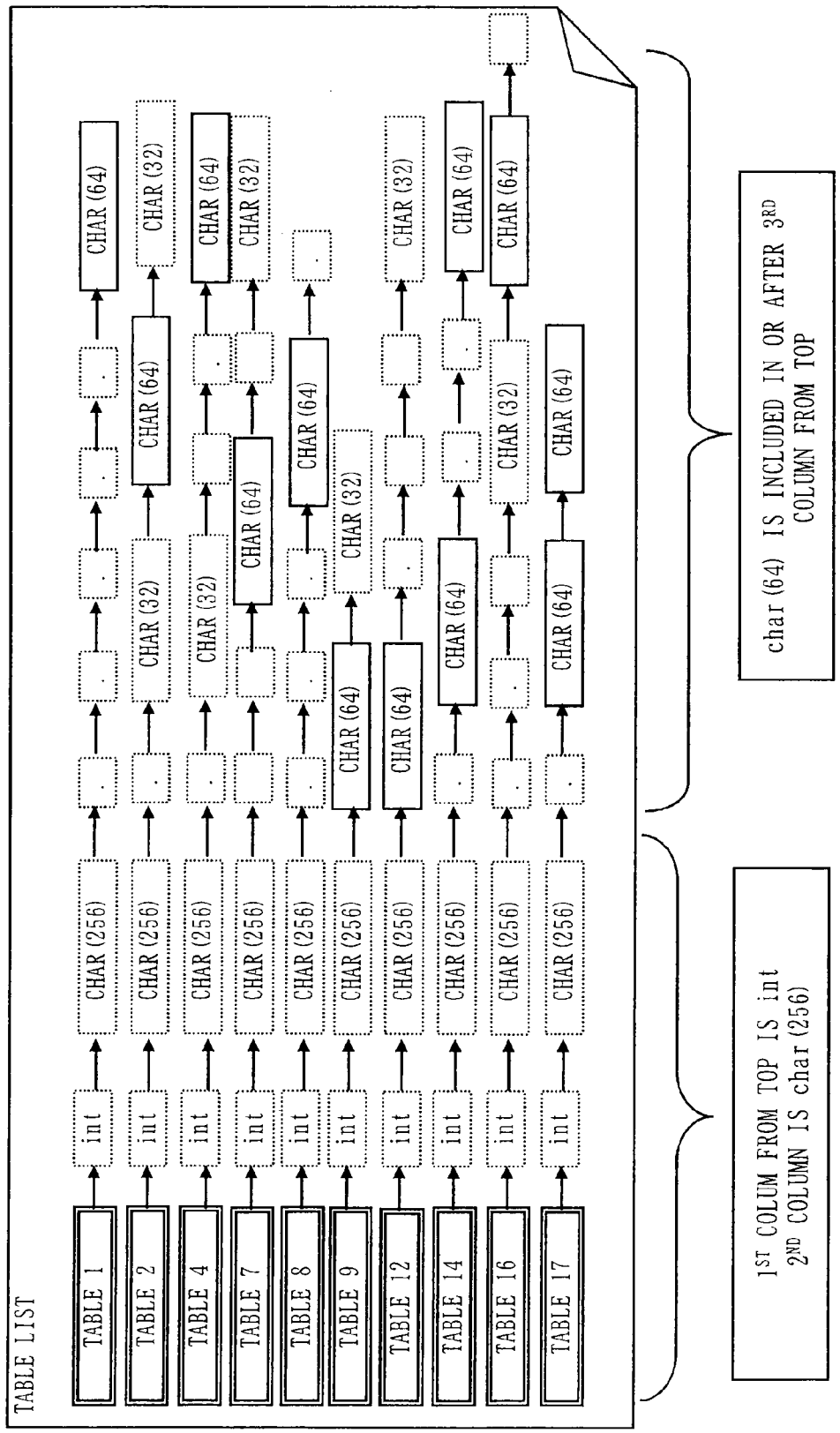
FIG. 22 is an explanatory drawing (8) of table classification by the statistical classifying unit 30.

At <S40>, the support rate of the next column, that is, the column number 5 (char(64)) is calculated. Among eighteen table nodes 111 shown in FIG. 19, ten table nodes 111 include the column node 112 of the column number 5 (char(64)). Therefore, the support rate is "10/18=55.6%". Here, since this group has been grouped by the column nodes 112 up to the second column node from the top, the support rate is calculated as a rate of the table nodes 111 including the column number 5 (char(64)) in or after the third column node 112. Here, FIG. 22 shows the table nodes 111 including the column number 5 (char(64)) out of eighteen table nodes 111 belonging to the group of the group number 32.

Subsequently, at <S36>, it is determined if the support rate calculated is less than the minimum support rate or not, and the support rate (55.6%) of the column number 5 (char(64)) exceeds the minimum support rate (5%) (NO at S36). Therefore, the operation proceeds to <S37>.

At <S37>, since the support rate is equal or greater than the minimum support rate, the table nodes 111 including the column number 5 (char(64)) are grouped. Further, the column number 5 (char(64)) is registered in the y+1 (=2) unprocessed list.

Figure 23:
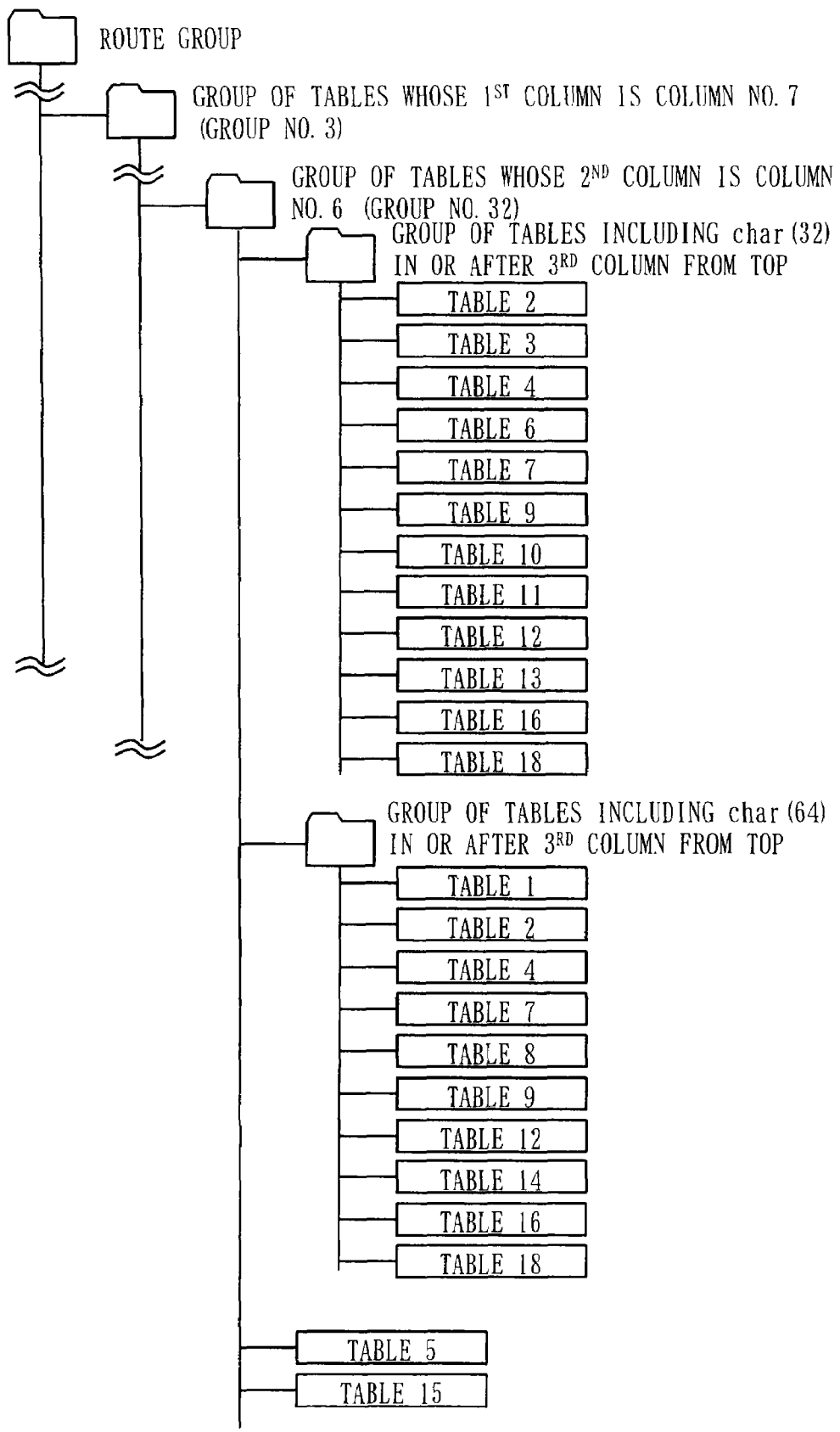
FIG. 23 is an explanatory drawing (9) of table classification by the statistical classifying unit 30.

Namely, as shown in FIG. 23, the group of the group number 32 is further classified. That is, at this point, in the group of the group number 32, the group of the table nodes 111 including the column number 4 (char(32)) and the group of the table nodes 111 including the column number 5 (char (64)) are formed.

At <S39>, since the support rate has been calculated for all combinations in the y unprocessed list, the operation proceeds to <S41>.

At <S41>, since two column nodes (the column number 4 (char(32) and the column number 5 (char(64)) exist in the y+1 (=2) unprocessed list (YES at S41), the operation proceeds to <S42>. Then, at <S42>, y is incremented, and the operation returns to <S35>.

Figure 24:
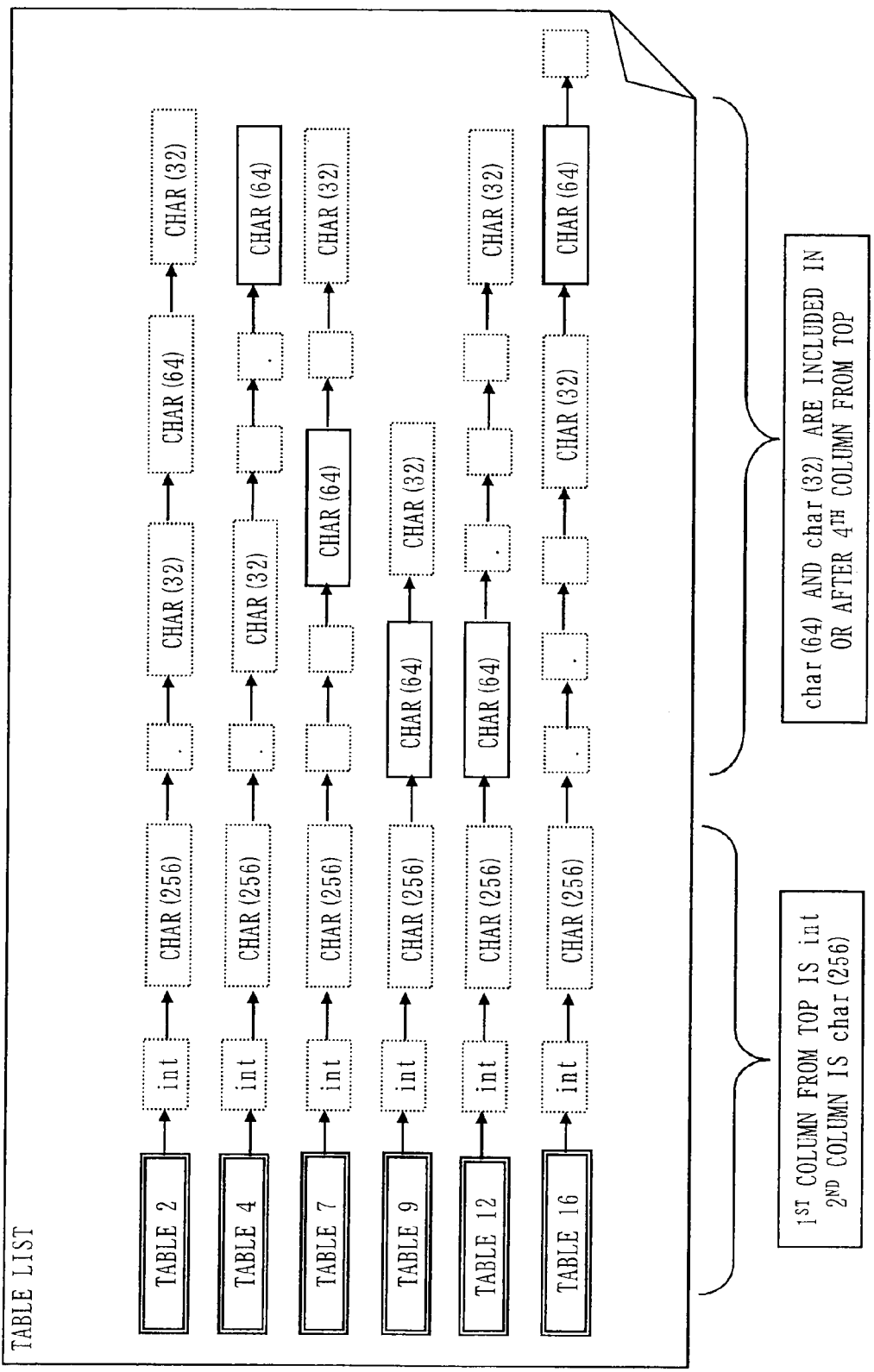
FIG. 24 is an explanatory drawing (10) of table classification by the statistical classifying unit 30.

At <S35>, the column number 4 (char(32)) and the column number 5 (char(64)) are extracted as y (=2) columns registered in the y unprocessed list. Then, a rate (the support rate) including both of the column number 4 (char(32)) and the column number 5 (char(64)) is calculated. Among eighteen table nodes 111 shown in FIG. 19, six table nodes 111 include the column node 112 of both of the column number 4 (char (32)) and the column number 5 (char(64)). Therefore, the support rate is "6/18=33.3%". Here, since this group has been grouped using the column nodes 112 up to the second column node from the top, the support rate is calculated as a rate of the table nodes 111 including both of the column number 4 (char (32)) and the column number 5 (char(64)) in or after the third column node 112. Here, FIG. 24 shows the table nodes 111 including both of the column number 4 (char(32)) and the column number 5 (char(64)) out of eighteen table nodes 111 belonging to the group of the group number 32.

Next, at <S36>, the statistical classifying unit 30 determines if the support rate calculated at <S35> is less than the minimum support rate or not. Here, the support rate (33.3%) of both of the column number 4 (char(32)) and the column number 5 (char(64)) exceeds the minimum support rate (5%) (NO at S36). Therefore, the operation proceeds to <S37>.

At <S37>, since the support rate is equal or greater than the minimum support rate, the table nodes 111 including both of the column number 4 (char(32)) and the column number 5 (char(64)) are grouped. Further, the combination of the column number 4 (char(32)) and the column number 5 (char (64)) is registered in the y+1 (=3) unprocessed list.

Figure 25:
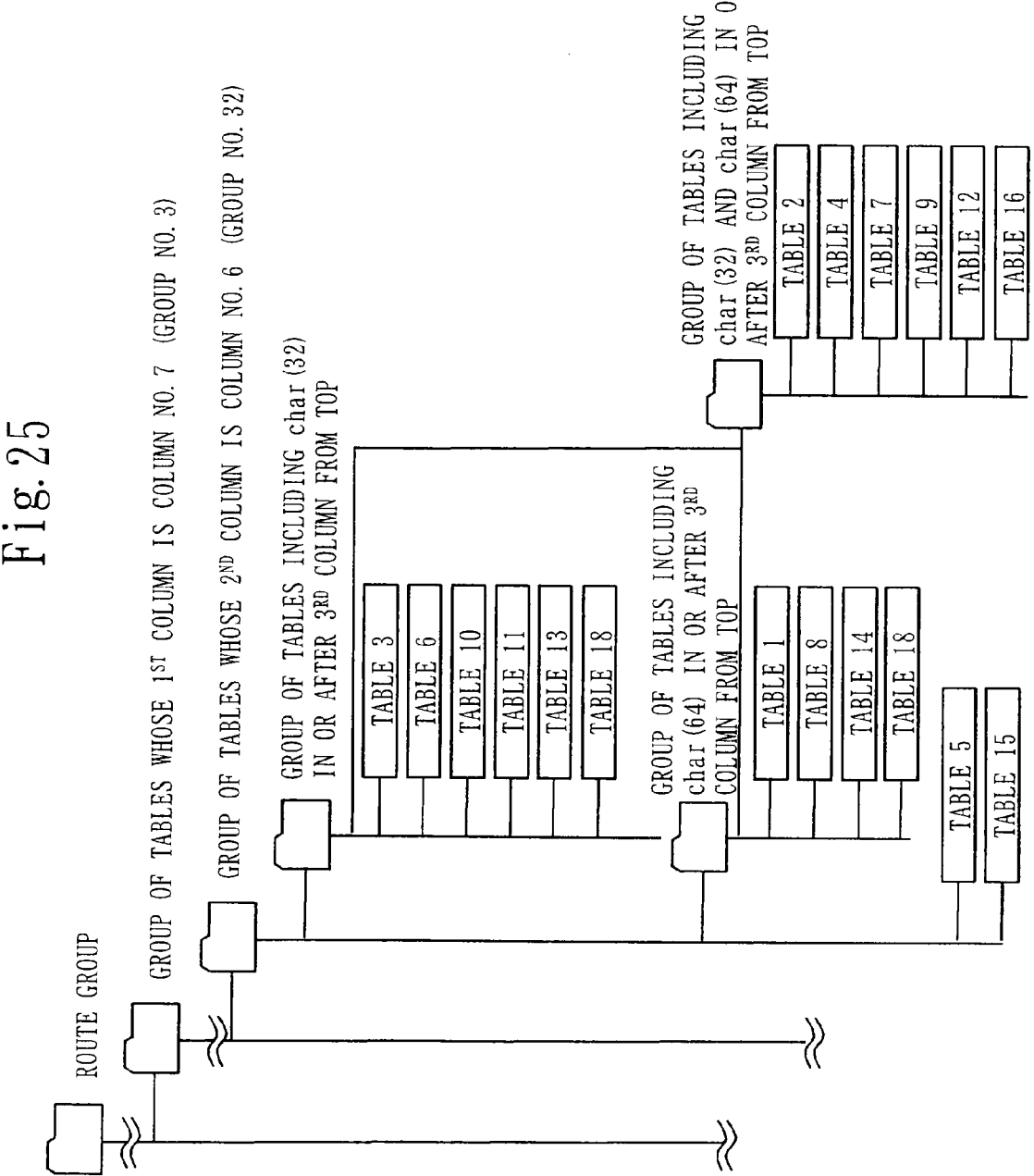
FIG. 25 is an explanatory drawing (11) of table classification by the statistical classifying unit 30.

Namely, as shown in FIG. 25, the group including the column number 4 (char(32)) and the group including the column number 5 (char(64)) formed in the group of the group number 32 are further classified. That is, the group of the table nodes 111 including both of the column number 4 (char(32)) and the column number 5 (char(64)) is formed both in the group including the column number 4 (char(32)) and the group including the column number 5 (char(64)) formed in the group of the group number 32.

At <S39>, the support rate has been calculated for all combinations, the operation of the statistical classifying unit 30 proceeds to <S41>. Further, at <S41>, since two or more combinations do not exist in the y+1 unprocessed list, the operation of the statistical classifying unit 30 proceeds to <S43>. Namely, the processing for the group of the group number 32 terminates.

Here, in the foregoing explanation, as shown in FIG. 23, some table nodes 111 overlap both in the group of the table nodes 111 including the column number 4 (char(32)) and the group of the table nodes 111 including the column number 5 (char(64)). Namely, one table node 111 may be sometimes classified into plural groups.

Figure 26:
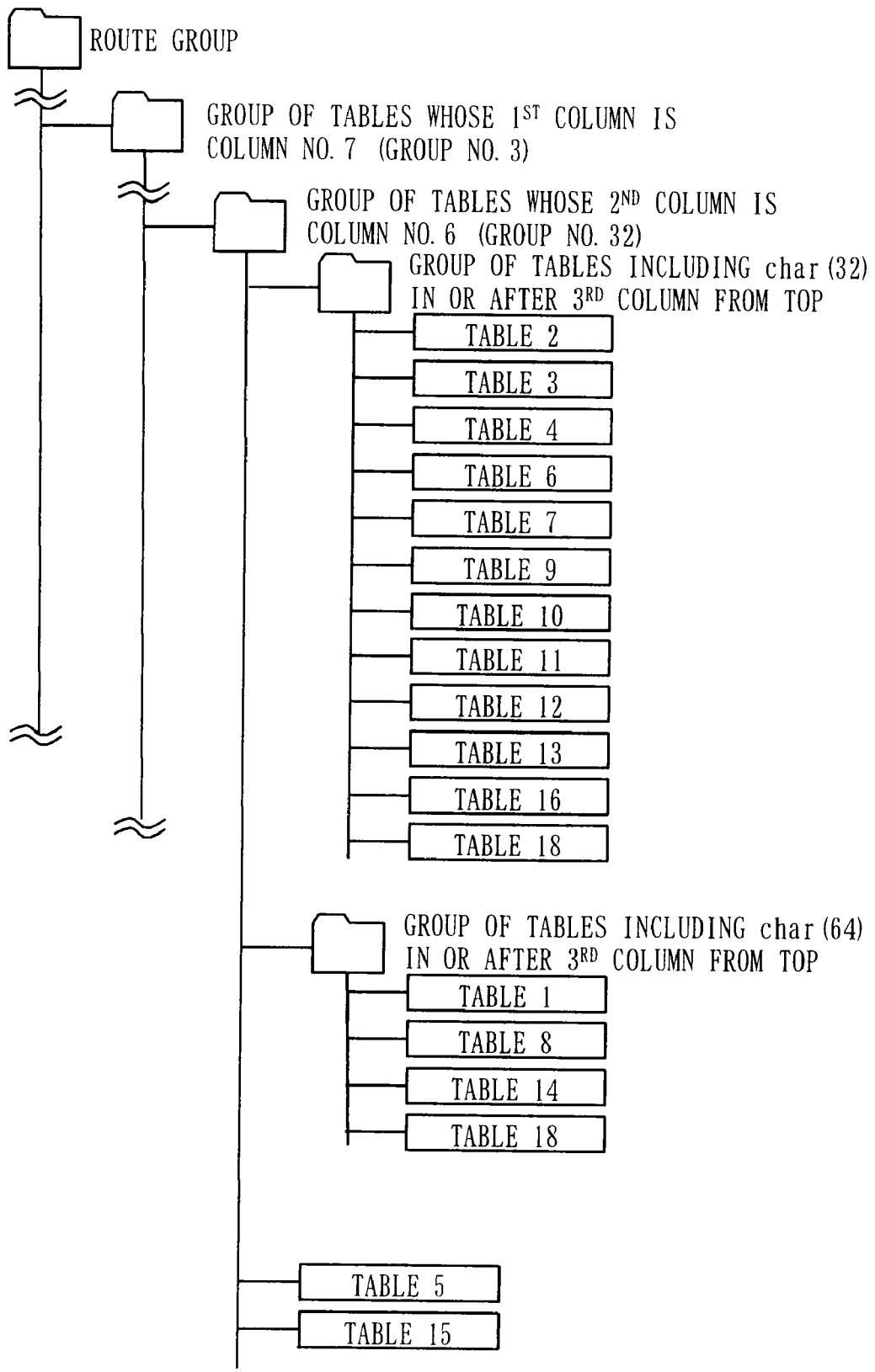
FIG. 26 is an explanatory drawing (12) of table classification by the statistical classifying unit 30.

However, another classification can be done avoiding classifying one table node 111 into plural groups. For example, when the support rate is calculated at <S40> or the table nodes are grouped at <S37>, the table node 111, which has been already classified into another group, can be omitted from the processing. Namely, in the example of the group number 32, the table node 111, which has been classified into the group of the table nodes 111 including the column number 4 (char (32)), can be omitted from the calculation of the support rate for the column number 5 (char(64)) or the classification into the group including the column number 5 (char(64)). That is, in the calculation of the support rate for the column number 5 (char(64)), the calculation can be done based on how many table nodes 111 include the column number 5 (char(64)) among six table nodes 111 except twelve table nodes 111 which have been classified to the group of the table nodes 111 including the column number 4 (char(32)). Namely, as shown in FIG. 26, the number of table nodes 111, which are classified to the group including the column number 5 (char(64)), is decreased.

In this case, the classification result is obtained with considering by priority the combination of columns previously selected at <S35>. Therefore, for example, at <S35>, a combination of columns having a high appearance rate can be selected sequentially from the highest appearance rate.

Like this, the table classification device 1 according to the present embodiment combines the semantic classification method and the statistical classification method. Consequently, it is possible to efficiently perform effective classification, which is closer to the classification of the user's intention than the mechanical classification.

The table classification device according to the present invention determines if tables are similar or not based on column information including location of columns in the table. Based on the location of columns in the table, it is possible to determine a role of the column in the table. Therefore, by the table classification device of the present invention, it is possible to determine the similarity of tables with considering roles of columns in the tables and to classify the tables.

Embodiment 2

In the first embodiment, the statistical classifying unit 30 carries out the processing with avoiding inclusion of overlapped columns. Namely, in the first embodiment, when extracting a combination of two or more columns at <S35>, the statistical classifying unit 30 extracts a combination of two or more different columns. For example, the statistical classifying unit 30 extracts the combination of the column number 4 (char(32)) and the column number 5 (char(64)). In other words, a combination including a plurality of the same columns is not extracted such as the combination of two column numbers 4 (char(32)). Here, the same column means columns of which the column type, the size, and the precision (scale) are the same.

In the present embodiment, the combination including a plurality of the same columns is also extracted. By extracting the combination including the plurality of the same columns, the classification of tables including a plurality of the same columns having the same column type, the size, and the scale (precision) can be done more efficiently.

Figure 27:
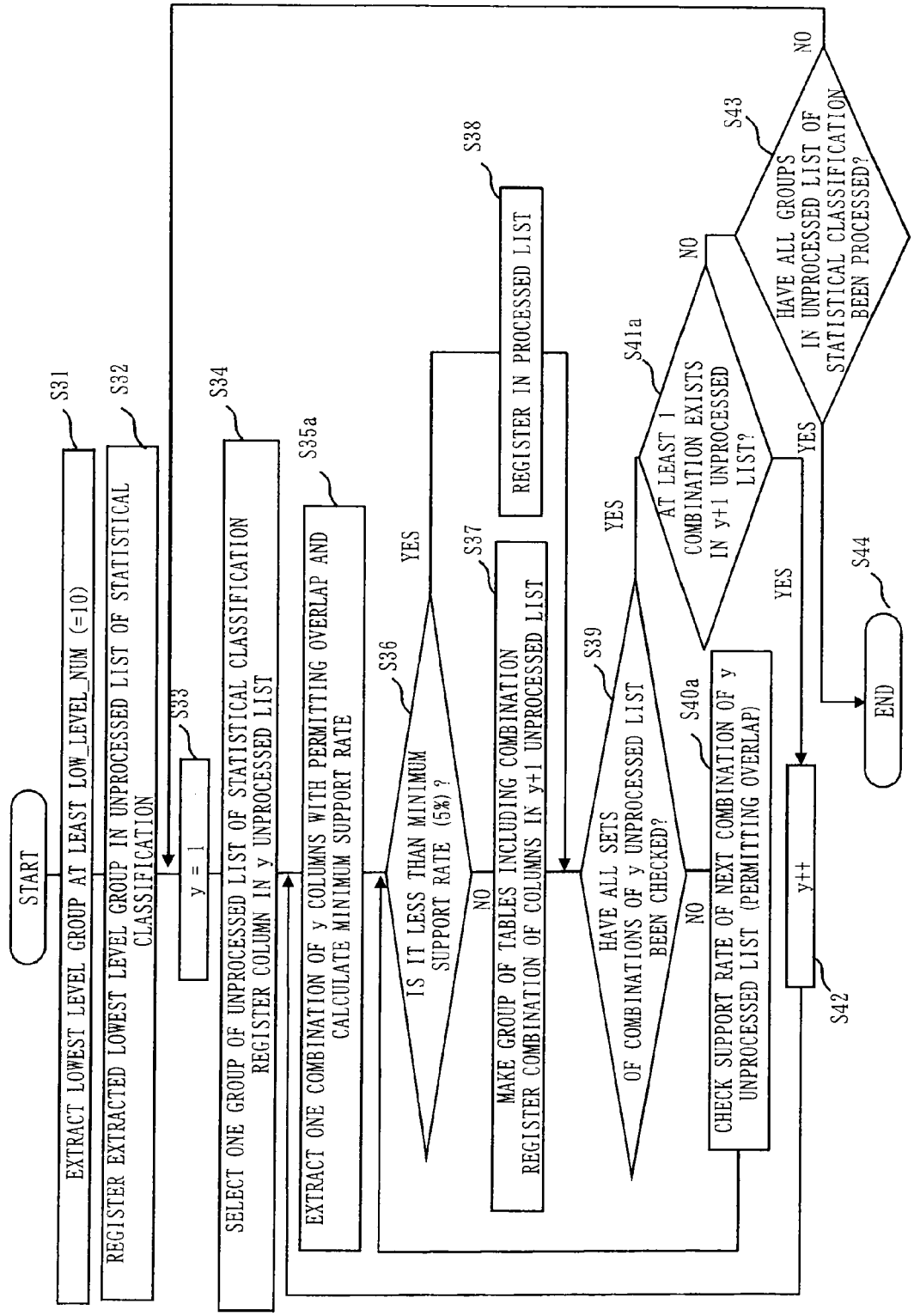
FIG. 27 is a flowchart showing an operation of a statistical classifying unit 30 according to the second embodiment.

FIG. 27 is a flowchart showing an operation of the statistical classifying unit 30 according to the present embodiment.

In the flowchart shown in FIG. 27, <S35>, <S40>, and <S41> of the flowchart shown in FIG. 14 are respectively changed to <S35a>, <S40a>, and <S41a>. In other words, other process of the flowchart shown in FIG. 27 are the same as ones of the flowchart shown in FIG. 14.

<S35a>: The statistical classifying unit 30 extracts one combination of y columns with permitting inclusion of overlapped columns from the y unprocessed list. Namely, the statistical classifying unit 30 extracts also a combination including a plurality of the same columns. Further, the statistical classifying unit 30 calculates an appearance rate (a support rate) of combination of y columns in each table node 111 in the group.

<S40a>: As well as <S35a>, the statistical classifying unit 30 calculates the support rate of the next combination with permitting inclusion of overlapped columns.

<S41a>: It is determined if a combination of one or more columns exists in the y+1 unprocessed list. If the combination of one or more columns exists (YES at S41), the operation proceeds to <S42>. On the other hand, if no combination of one or more columns exists (NO at S41), the operation proceeds to <S43>. In the first embodiment, unless the combination of two or more columns exists, the grouping of the next hierarchy cannot be done by incrementing y However, here, if the combination of only one column exists, new grouping can be done by grouping the overlapped table nodes including the combination. Therefore, here, if only the combination of one or more columns exists, the operation proceeds to <S42>.

As an example of the classification, the group of the group number 32 shown in FIG. 19 is classified in the method shown in FIG. 27. While y=1. the same processing is done as the first embodiment. Therefore, as shown in FIG. 23, a group of the table node 111 including the column number 4 (char(32)) and a group of the table node 111 including the column number 5 (char(64)) are formed in the group of the group number 32.

Subsequently, y is incremented to y=2 at <S42>, and the operation returns to <S35a>.

At <S35a>, one combination of y (=2) columns, with permitting inclusion of overlapped combination, is extracted. Here, the column number 4 (char(32)) and the column number 5 (char(64)) are registered in the y unprocessed list. Therefore, a combination of two column numbers 4 (char(32)) is extracted. Then, a support rate of the extracted combination is calculated.

Figure 28:
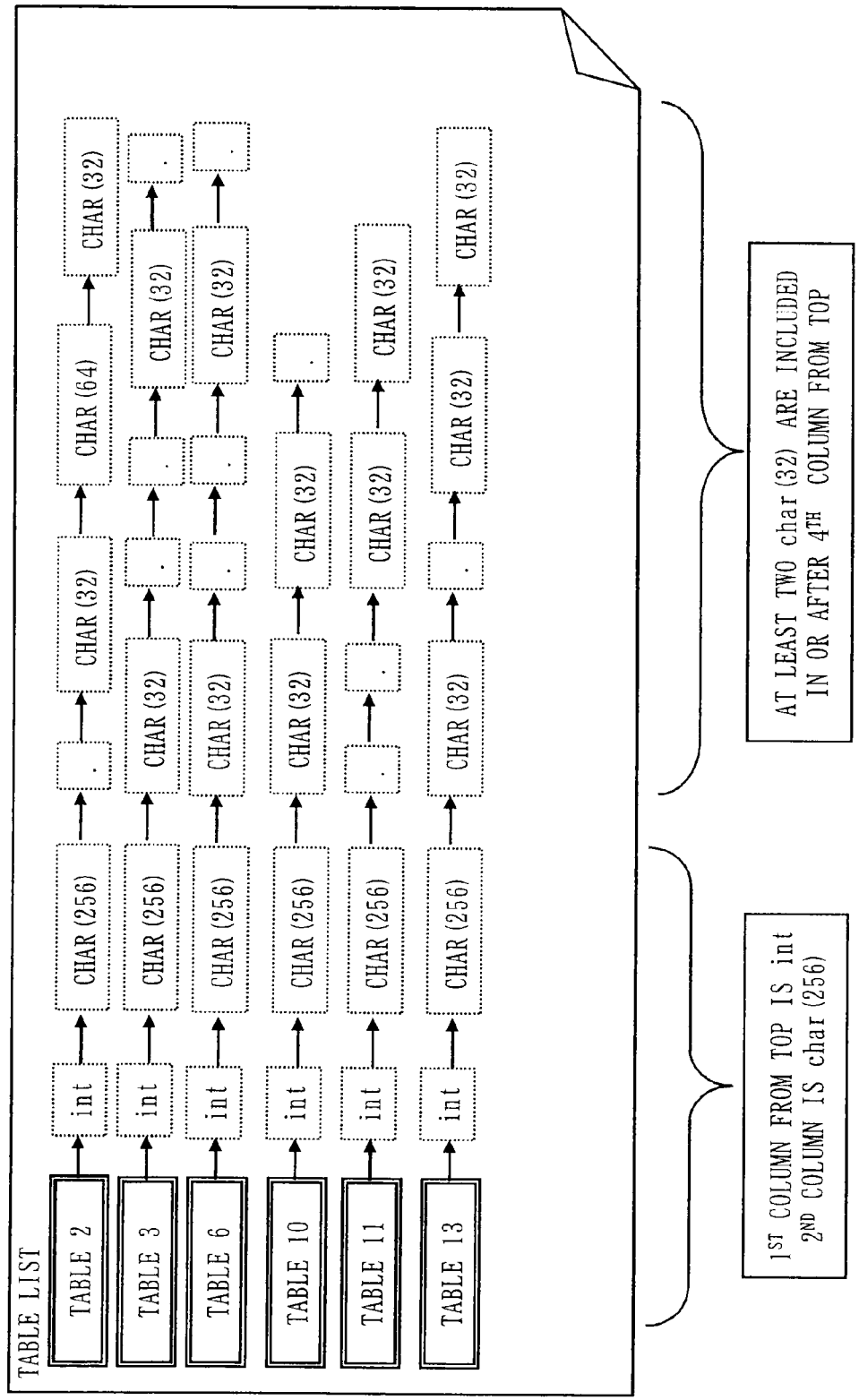
FIG. 28 is an explanatory drawing (1) of table classification by the statistical classifying unit 30 according to the second embodiment.

Six table nodes 111 include two or more column numbers 4 (char(32)). Therefore, the support rate is 6/18=33.3%. Here, since this group has been grouped using the column nodes 112 up to the second column node from the top, the support rate is calculated as a rate of the table nodes 111 including two or more column numbers 4 (char(32)) in or after the third column node 112. Here, FIG. 28 shows the table nodes 111 including two or more column numbers 4 (char(32)) out of eighteen table nodes 111 belonging to the group of the group number 32.

Subsequently, at <S36>, it is determined if the calculated support rate is less than the minimum support rate or not, and the support rate (33.3%) of the column number 4 (char(32)) exceeds the minimum support rate (5%) (NO at S36). Therefore, the operation proceeds to <S37>.

At <S37>, since the support rate is equal to or greater than the minimum support rate, the table nodes 111 including two or more column numbers 4 (char(32)) are grouped. Further, the combination of two column numbers 4 (char(32)) is registered in the y+1 (=3) unprocessed list.

Figure 29:
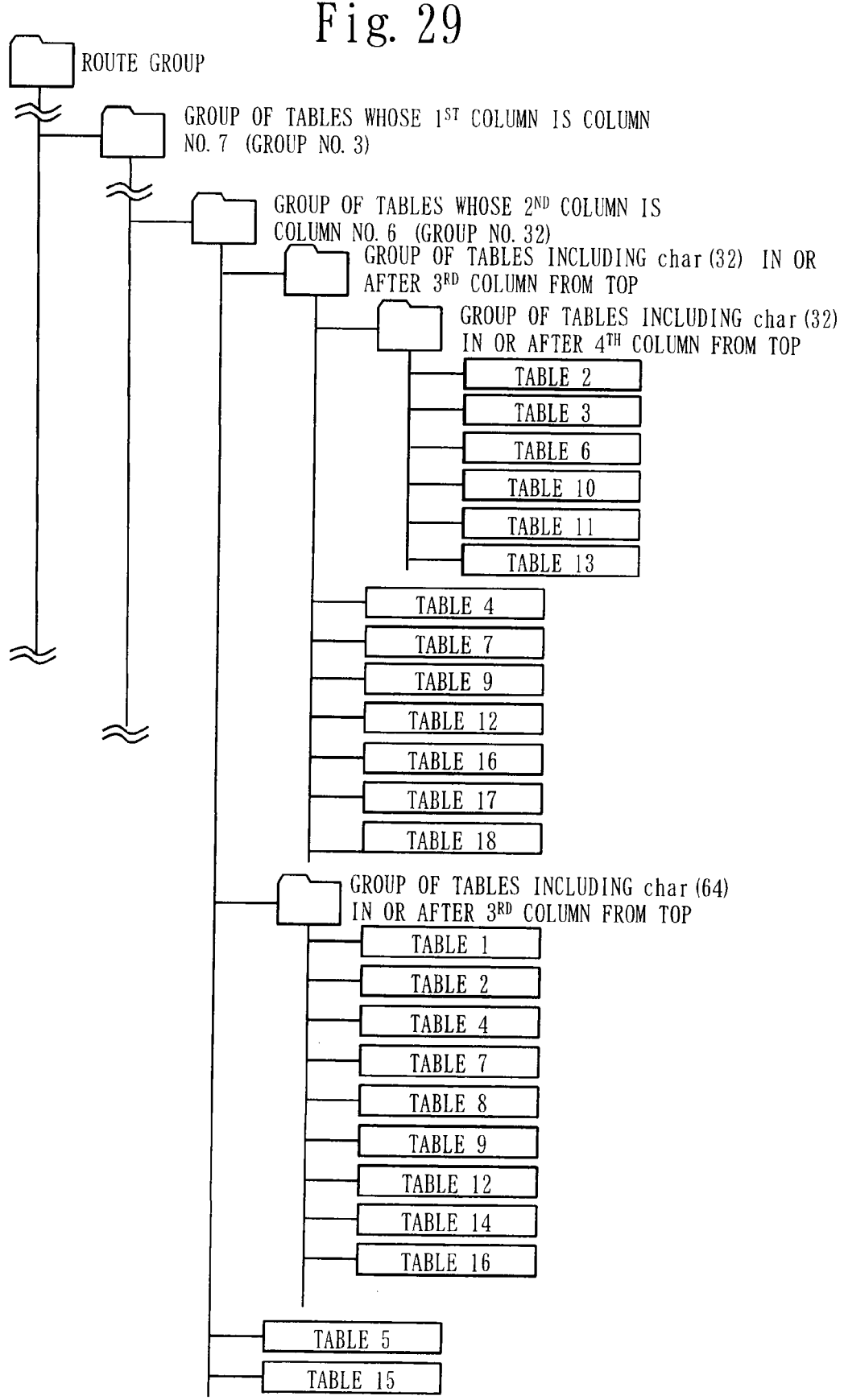
FIG. 29 is an explanatory drawing (2) of table classification by the statistical classifying unit 30 according to the second embodiment.

Namely, as shown in FIG. 29, the group including the column number 4 (char(32)) formed in the group of the group number 32 are further classified. That is, the group of the table nodes 111 including two or more column numbers 4 (char(32)) is formed in the group including the column number 4 (char(32)) formed in the group of the group number 32.

Subsequently, at <S39>, since all combinations have not been selected (NO at S39), next combination is selected at <S40a> and the classification is carried out. Namely, the processing on a combination of two column numbers 5 (char(64)) and the processing on a combination of the column number 4 (char(32)) and the column number 5 (char(64)) are done in the same manner.

Then, y is incremented further, the processing on a combination of three column numbers 4 (char(32)), etc. is carried out in the same manner. The processing is repeated until an end condition is satisfied at <S41a>, and the processing terminates for this group when the end condition is satisfied at <S41a>.

After that, the processing is done for other groups in the same manner, and when the processing for all the groups is finished (YES at S43), the processing of the statistical classifying unit 30 terminates.

Embodiment 3

In the above embodiments, the columns are compared to determine the equality (determination if they are similar or not) using the column list 12 of FIG. 5. In the present embodiment, the columns are further compared to determine the equality with considering if NULL value is allowed or not in each column.

In general, a column for which NULL value is not allowed is often a key item, which includes contents (quality) of data being different from an item for which NULL value is allowed. Therefore, by comparing the columns to determine the equality with considering availability of NULL value, it is possible to classify tables more efficiently.

FIG. 30 shows the column list 12 with considering availability of NULL value.

In the column list 12 shown in FIG. 30, the column number 121 is assigned separately according to the "availability of NULL value" 126 even if the column type 122, the size 123, and the scale 124 are the same. Namely, columns of which the column type 122, the size 123, the scale 124, and the "availability of NULL value" 126 are the same are treated as the same columns. Instead of the column list 12 shown in FIG. 5, by using the column list 12 shown in FIG. 30, the semantic classification method and the statistical classification method discussed in the foregoing embodiments are carried out, and thus it is possible to classify the tables efficiently.

Embodiment 4

In the present embodiment, the columns are further compared to determine the equality with considering if each column is a key item or not.

A key item means a main key or a foreign key, etc. The column of key item has contents (quality) of data being different from the column which is not a key item. Therefore, by comparing the columns to determine the equality with considering if the column is a key item or not, it is possible to classify the tables more efficiently.

FIG. 31 shows the column list 12 with considering if it is a key item or not.

In the column list 12 shown in FIG. 31, the column number 121 is assigned separately according to an "indication of a key item" 127 even if the column type 122, the size 123, and the scale 124 are the same. Namely, columns of which the column type 122, the size 123, the scale 124, and the "indication of a key item" 127 are the same are treated as the same columns. Instead of the column list 12 shown in FIG. 5, by using the column list 12 shown in FIG. 31, the semantic classification method and the statistical classification method discussed in the foregoing embodiments are carried out, and thus it is possible to classify the tables efficiently.

Further, another column list 12 can be used with dividing an key item into a main key and a foreign key.

That is, the table classification device 1 according to the foregoing embodiments accumulates comparisons of respective columns in the tables stored in databases of different types existing in a company. Then, by determining structural similarity among the tables formed by such columns, the classification of tables is carried out.

When summarized, the following can be said.

A table classification device I classifying tables stored in various databases of a company based on similarity of a type, a size, and a scale (precision) of columns which form the table, the table classification device 1 includes:

a list generating unit 10 inputting catalog information of the database, generating a table list 11, and according to a column correspondence table 14 which describes relationship among columns of different databases, generating a column list 12 and a frequently appearing column list 13;

a semantic classifying unit 20 classifying with considering meaning of columns which form the database; and a statistical classifying unit 30 carrying out classification based on statistical information of columns, and the table classification device 1 classifies hierarchically by combining the classification method of the semantic classifying unit 20 and the classification method of the statistical classifying unit 30.

The statistical classifying unit 30, which classifies based on the statistical information of columns, carries out the statistical classification on classified result of the semantic classifying unit 20, which classifies with considering meaning of columns that form the table, as a classification of upper hierarchy.

The column correspondence table 14 is characterized in that, by making correspondence among columns of databases of different types, compares the column type, the size, and the scale (precision) of data type defined in the databases of different types.

The semantic classifying unit 20, which carries out classification with considering meanings of columns which form the database, is characterized to focus on an order of alignment of columns which form the table, and classify the tables according to the equality of the column type, the size, and the scale (precision) of some columns which form the table from the top of the node.

The statistical classifying unit 30, which carries out classification based on statistical information of the columns, is characterized to classify the tables by the statistical classification method, which classifies the tables including combinations of columns of which the column type, the size, and the scale (precision) are the same with considering a combination of columns which form the table.

The statistical classification method, which classifies the tables with considering the combination of columns, is characterized to classify the tables according to the combination of columns with considering the number of appearances when a plurality of columns of the same type appear.

It is characterized to compare columns with considering the availability of NULL value of the column in addition to the column type, the size, and the scale (precision).

It is characterized to compare columns with considering if the column is a key item or not in addition to the column type, the size, and the scale (precision).

Further, a role of the column in the table means, for example, it is a key item, a main key, a foreign key, an index, etc.

Next, a hardware configuration of the table classification device 1 according to the foregoing embodiments will be explained.

FIG. 32 shows an example of the hardware configuration of the table classification device 1.

As shown in FIG. 32, the table classification device 1 includes a CPU 911 (Central Processing Unit, also called as a processing unit, an operation unit, a microprocessor, a microcomputer, or a processor). The CPU 911 is connected to a ROM 913, a RAM 914, an LCD 901 (Liquid Crystal Display), a keyboard 902 (K/B), a communication board 915, and a magnetic disk drive 920 via a bus 912, and controls these hardware devices. The magnetic disk drive 920 can be replaced with memories such as an optical disk drive, a memory card reader/writer, etc.

The ROM 913 and the magnetic disk drive 920 are examples of a non-volatile memory The RAM 914 is an example of a volatile memory. The ROM 913, the RAM 914, and the magnetic disk drive 920 are examples of a memory device (memory). Further, the keyboard 902 and the communication board 915 are examples of an inputting device. Further, the communication board 915 is an example of a communication device. Further, the LCD 901 is an example of a displaying device. The communication board 915 and the LCD 901 are examples of an outputting device.

The magnetic disk drive 920 or the ROM 913 stores an operating system 921 (OS), a window system 922, a group of programs 923, and a group of files 924. Programs of the group of programs 923 are executed by the CPU 911, the operating system 921, or the window system 922.

The group of programs 923 stores programs of a software and a program for implementing functions which have been explained in the foregoing embodiments as "the list generating unit 10", "the semantic classifying unit 20", "the statistical classifying unit 30", "the outputting unit 40", etc. and other programs. The programs are read and executed by the CPU 911.

The group of files 924 store information, data, signal values, variable values, or parameters such as "the table list 11", "the column list 12", "the frequently appearing column list 13", "the column correspondence table 14", "the table semantic classification table 21", "the table classification list 31", etc. as each item of "files" or "databases". "Files" or "databases" are stored in a recording medium such as a disk or a memory. Information, data, signal values, variable values or parameters are read by the CPU 911 via a reading/writing circuit to a main memory or a cache memory and used for the operation of the CPU 911 such as extraction, retrieval, reference, comparison, operation, calculation, processing, output, printing, displaying, etc. During the operation of the CPU 911 of extraction, retrieval, reference, comparison, operation, calculation, processing, output, printing, and displaying, the information, data, signal values, variable values or parameters are temporarily stored in the main memory, the cache memory, or a buffer memory.

Further, an arrow of the flowcharts in the above explanation mainly shows an input/output of data or signals, and data or signal values are recorded in a memory of the RAM 914 or the recording medium such as the optical disk, etc. Further, the data or signals are transmitted on-line via transmission medium such as the bus 912, the signal line, a cable, and so on.

Further, in the above explanation, what is explained as "—unit" can be "—circuit", "—device", "—equipment", "—means", "—function" and also can be "—step", "—procedure", "—process". Further, what is explained as "—device" can be "—circuit", "—device", "—equipment", "—means", "—function" and also can be "—step", "—procedure", "—process". Further, what is explained as "—process" can be "—step". Namely, what is explained as "—unit" can be implemented by firmware stored in the ROM 913. Or it can be implemented by only by software, only by hardware such as elements, devices, boards, wiring, etc., or a combination of software and hardware, and further implemented by a combination with firmware. The firmware and software are stored as programs in the recording medium such as the ROM 913, etc. The programs are read by the CPU 911 and executed by the CPU 911. Namely, the programs are to function a computer, etc. as "—unit" which has been explained above. Or the programs are to have a computer, etc. execute a procedure or a method of "—unit" which has been explained above.

Having thus described several particular embodiments of the present invention, various alterations, modifications, and improvements will readily occur to those skilled in the art. Such alterations, modifications, and improvements are intended to be part of this disclosure, and are intended to be within the spirit and scope of the present invention. Accordingly, the foregoing description is by way of example only, and is not intended to be limiting. The present invention is limited only as defined in the following claims and the equivalents thereto.

The invention claimed is:

1. A table classification device classifying a plurality of tables included in a plurality of databases into a plurality of groups, the table classification device comprising:
   using a processing device, a first classifying unit for determining if respective tables of the plurality of tables are similar based on column information including locations of columns in the respective tables, and according to determination result, classifying the plurality of tables into a plurality of groups;
   using the processing device, a second classifying unit for determining if the respective tables are similar based on column information other than locations of columns in the respective tables, and according to determination result, classifying the plurality of tables into a plurality of groups; and
   an outputting unit for outputting result classified by the first classification unit and the second classification unit to an outputting device, wherein
   the first classifying unit determines if the respective tables are similar or not based on if to columns in the tables are similar, and according to determination result, classifies the plurality of tables into a plurality of groups, and
   the first classifying unit determines if respective tables of the plurality of tables classified into a same group are similar based on if second columns in the respective tables are similar, and according to determination result, further classifies the plurality of tables classified into the same group into a plurality of groups.

2. The table classification device of claim 1, wherein the second classifying unit further classifies tables classified by the first classifying unit into a same group.

3. The table classification device of claim 1, wherein the first classifying unit determines if the respective tables are similar based on if a prescribed number of top columns in the table are similar.

4. The table classification device of claim 1, wherein the second classifying unit determines if respective tables are similar or not based on if the respective tables include a similar column or not.

5. The table classification device of claim 4, wherein the second classifying unit, when the respective tables include similar columns, determines if the respective tables are similar based on if the similar columns are frequently appearing columns included in at least a prescribed number of tables among the plurality of tables.

6. The table classification device of claim 4, wherein the second classifying unit determines if the respective tables are similar based on if the respective tables include one similar column, and according to determination result, classifies the plurality of tables into a plurality of groups, and
   the second classifying unit, in a plurality of tables classified into a same group, as well determines if the respective tables are similar based on if respective tables of the plurality of tables classified into the same group include two similar columns, and according to determination result, further classifies the plurality of tables classified into the same group into a plurality of groups.

7. The table classification device of claim 1, wherein at least one of the first classifying unit and the second classifying unit determines if columns are similar based on if prescribed attribute of the columns are same.

8. The table classification device of claim 7, wherein at least one of the first classifying unit and the second classifying unit uses at least one of a column type, a size, and a precision as the attribute of the columns.

9. The table classification device of claim 8, wherein at least one of the first classifying unit and the second classifying unit further uses information showing if NULL value is allowed for a column value as the attribute of the columns.

10. The table classification device of claim 8, wherein at least one of the first classifying unit and the second classifying unit further uses information showing if a column is a key item as the attribute of the columns.

11. A table classification device for classifying a plurality of tables included in a plurality of databases, the table classification device comprising:
    using a processing device, a role classifying unit for determining if respective tables of the plurality of tables are similar based on if columns of a same role are similar in the respective tables, and according to determination result, classifying the plurality of tables into a plurality of groups;
    using the processing device, a statistical classifying unit for determining if the respective tables of the plurality of tables are similar based on if a similar column is included regardless of the role of the column in the respective tables, and according to determination result, classifying the plurality of tables into a plurality of groups;
    using the processing device, a first classifying unit determines if the respective tables are similar based on if to columns in the tables are similar, and according to determination result, classifies the plurality of tables into a plurality of groups;
    using the processing device, a first classifying unit determines if respective tables of the plurality of tables classified into a same group are similar based on if second columns in the respective tables are similar, and according to determination result, further classifies the plurality of tables classified into the same group into a plurality of groups; and
    an outputting unit for outputting result classified by the role classifying unit and the statistical classifying unit to an outputting device.

12. A table classification method classifying a plurality of tables included in a plurality of databases into a plurality of groups, the table classification method comprising:
    using a processing device, a first classifying step for determining if respective tables of the plurality of tables are similar based on column information including locations of columns in the respective tables, and according to determination result, classifying the plurality of tables into a plurality of groups;
    using the processing device, a second classifying step for determining if the respective tables are similar based on column information other than locations of columns in the respective tables, and according to determination result, classifying the plurality of tables into a plurality of groups; and
    using an outputting device, an outputting step for outputting result classified by the first classification step and the second classification step, wherein
    the first classifying step determines if the respective tables are similar based on if to columns in the tables are similar, and according to determination result, classifies the plurality of tables into a plurality of groups, and
    the first classifying step determines if respective tables of the plurality of tables classified into a same group are similar based on if second columns in the respective tables are similar, and according to determination result, further classifies the plurality of tables classified into the same group into a plurality of groups.

13. A table classification program classifying a plurality of tables included in a plurality of databases into a plurality of groups, the table classification program comprising:
- a first classifying process for determining if respective tables are similar based on column information including locations of columns in the respective tables, and according to determination result, classifying the plurality of tables into a plurality of groups;
- a second classifying process for determining if the respective tables are similar based on column information other than locations of columns in the respective tables, and according to determination result, classifying the plurality of tables into a plurality of groups; and
- an outputting process for outputting result classified by the first classification step and the second classification step, wherein
- the first classifying process determines if the respective tables are similar based on if to columns in the tables are similar, and according to determination result, classifies the plurality of tables into a plurality of groups, and
- the first classifying process determines if respective tables of the plurality of tables classified into a same group are similar based on if second columns in the respective tables are similar, and according to determination result, further classifies the plurality of tables classified into the same group into a plurality of groups.

* * * * *